(12) United States Patent
Sevindik et al.

(10) Patent No.: US 11,470,687 B2
(45) Date of Patent: Oct. 11, 2022

(54) MULTI-MODE WIRELESS APPARATUS AND METHODS OF OPERATION

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/748,507

(22) Filed: Jan. 21, 2020

(65) Prior Publication Data

US 2021/0227628 A1 Jul. 22, 2021

(51) Int. Cl.
| | |
|---|---|
| H04W 4/00 | (2018.01) |
| H04W 88/06 | (2009.01) |
| H04W 16/14 | (2009.01) |
| H04W 84/12 | (2009.01) |
| H04W 28/18 | (2009.01) |
| H04W 16/26 | (2009.01) |
| H04W 84/04 | (2009.01) |
| H04W 88/10 | (2009.01) |

(52) U.S. Cl.
CPC ........... *H04W 88/06* (2013.01); *H04W 16/14* (2013.01); *H04W 16/26* (2013.01); *H04W 28/18* (2013.01); *H04W 84/045* (2013.01); *H04W 84/12* (2013.01); *H04W 88/10* (2013.01)

(58) Field of Classification Search
CPC ..... H04W 88/06; H04W 88/10; H04W 16/14; H04W 16/26; H04W 28/18; H04W 28/04; H04W 84/045; H04W 84/12

USPC ......................................................... 370/329
See application file for complete search history.

(56) References Cited

U.S. PATENT DOCUMENTS

| | | |
|---|---|---|
| 8,997,136 B2 | 3/2015 | Brooks et al. |
| 9,564,932 B1 | 2/2017 | Pack et al. |
| 9,612,816 B2 | 4/2017 | Choi et al. |
| 9,654,149 B2 | 5/2017 | Piipponen et al. |
| 2003/0229899 A1 | 12/2003 | Thompson et al. |
| 2004/0034697 A1 | 2/2004 | Fairhurst et al. |

(Continued)

OTHER PUBLICATIONS

3GPP., "Radio Resource Control (RRC) protocol specification (Release 16)", Technical Specification Group Radio Access Network, TS 38.331 (V16.0.0), Mar. 2020, 832 pages.

(Continued)

*Primary Examiner* — Temica M Beamer
(74) *Attorney, Agent, or Firm* — Patent Beach PC

(57) ABSTRACT

Apparatus and methods for multi-mode operation of a wireless-enabled device, including for extending the range of the wireless signal in a wireless network. In one embodiment, a multi-mode Consumer Premises Equipment (CPE) is provided utilizing "quasi-licensed" CBRS (Citizen Broadband Radio Service) wireless spectrum. In one variant, the apparatus and methods provide a solution to use a CPE in a Wi-Fi extender mode to extend Wi-Fi signal from a router. In another variant, a solution is provided to use a CPE in an LTE repeater mode to extend the LTE signal from an LTE eNB/gNB. In another embodiment, a CPE is used as a base station for a wireless network utilizing "quasi-licensed" CBRS (Citizen Broadband Radio Service) wireless spectrum.

19 Claims, 22 Drawing Sheets

(56) References Cited

U.S. PATENT DOCUMENTS

| | | |
|---|---|---|
| 2004/0040041 A1 | 2/2004 | Crawford |
| 2004/0073944 A1 | 4/2004 | Booth |
| 2004/0078829 A1 | 4/2004 | Patel et al. |
| 2004/0143836 A1 | 7/2004 | McCormack et al. |
| 2004/0181811 A1 | 9/2004 | Rakib |
| 2005/0162267 A1 | 7/2005 | Khandelwal et al. |
| 2006/0161946 A1 | 7/2006 | Shin |
| 2007/0207771 A1 | 9/2007 | Bowser et al. |
| 2010/0035610 A1 | 2/2010 | Narang et al. |
| 2011/0124335 A1 | 5/2011 | Martin et al. |
| 2013/0201316 A1 | 8/2013 | Binder et al. |
| 2014/0269470 A1* | 9/2014 | Hybertson ............ G06F 11/079 370/311 |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2016/0007138 A1 | 1/2016 | Palanisamy et al. |
| 2017/0094527 A1 | 3/2017 | Shattil et al. |
| 2017/0111846 A1 | 4/2017 | Kang |
| 2017/0149937 A1 | 5/2017 | Ren et al. |
| 2017/0155703 A1 | 6/2017 | Hao et al. |
| 2017/0208540 A1 | 7/2017 | Egner et al. |
| 2017/0316233 A1 | 11/2017 | Kherani et al. |
| 2018/0316563 A1 | 11/2018 | Kumar et al. |
| 2018/0351665 A1 | 12/2018 | Fukuta et al. |
| 2018/0375887 A1 | 12/2018 | Dezent et al. |
| 2019/0349848 A1* | 11/2019 | Bali ...................... H04W 80/10 |
| 2020/0169894 A1* | 5/2020 | Dillon ................... H04W 16/14 |
| 2020/0412565 A1 | 12/2020 | Joshua |
| 2021/0297141 A1* | 9/2021 | Schafer ................. H01Q 1/246 |
| 2021/0336332 A1* | 10/2021 | LoBianco ............ H01L 23/3121 |

OTHER PUBLICATIONS

3GPP TS 23.501 v.15.4.0 (Dec. 2018) 3rd Generation Partnership Project; Technical Specification Group Services and System Aspects; System Architecture for the 5G System; Stage 2; Release 15, 236 pages.

3GPP TS 38.306 3rd Generation Partnership Project; Technical Specification Group Radio Access Network; NR; User Equipment (UE) radio access capabilities (Release 15), (Dec. 2020) 60 pages.

3GPP TS 38.413 3rd Generation Partnership Project; Technical Specification Group Radio Access Network; NG-RAN; NG Application Protocol (NGAP) (Release 16), (Dec. 2019) 335 pages.

3GPP TS 38.889 3rd Generation Partnership Project; Technical Specification Group Radio Access Network; Study on NR-based Access to Unlicensed Spectrum; Release 16, (Nov. 2018), 120 pages.

Article 5 of the Radio Regulations (edition 2001), Introduction to International Radio Regulations, 161 pages.

Bluetooth/BLE, IEEE Std. 802.15.4.

Deering S., et al., "Internet Protocol, Version 6 (IPv6) Specification", Internet Engineering Task Force (IETF), Dec. 1998, 39 pages.

IEEE 802.11 standard, 1997, www.ieeexplore.ieee.org/document/654779.

IEEE Standards 802.3, 2008, 27 pages.

"Internet Protocol, DARPA Internet Program, Protocol Specification", IETF RCF 791, Sep. 1981.

Nokia 5G New Radio (NR): Physical Layer Overview and Performance, IEEE Communication Theory Workshop, 2018 by A. Ghosh, May 15, 2018, 38 pages.

Zigbee/802.15.4.

* cited by examiner

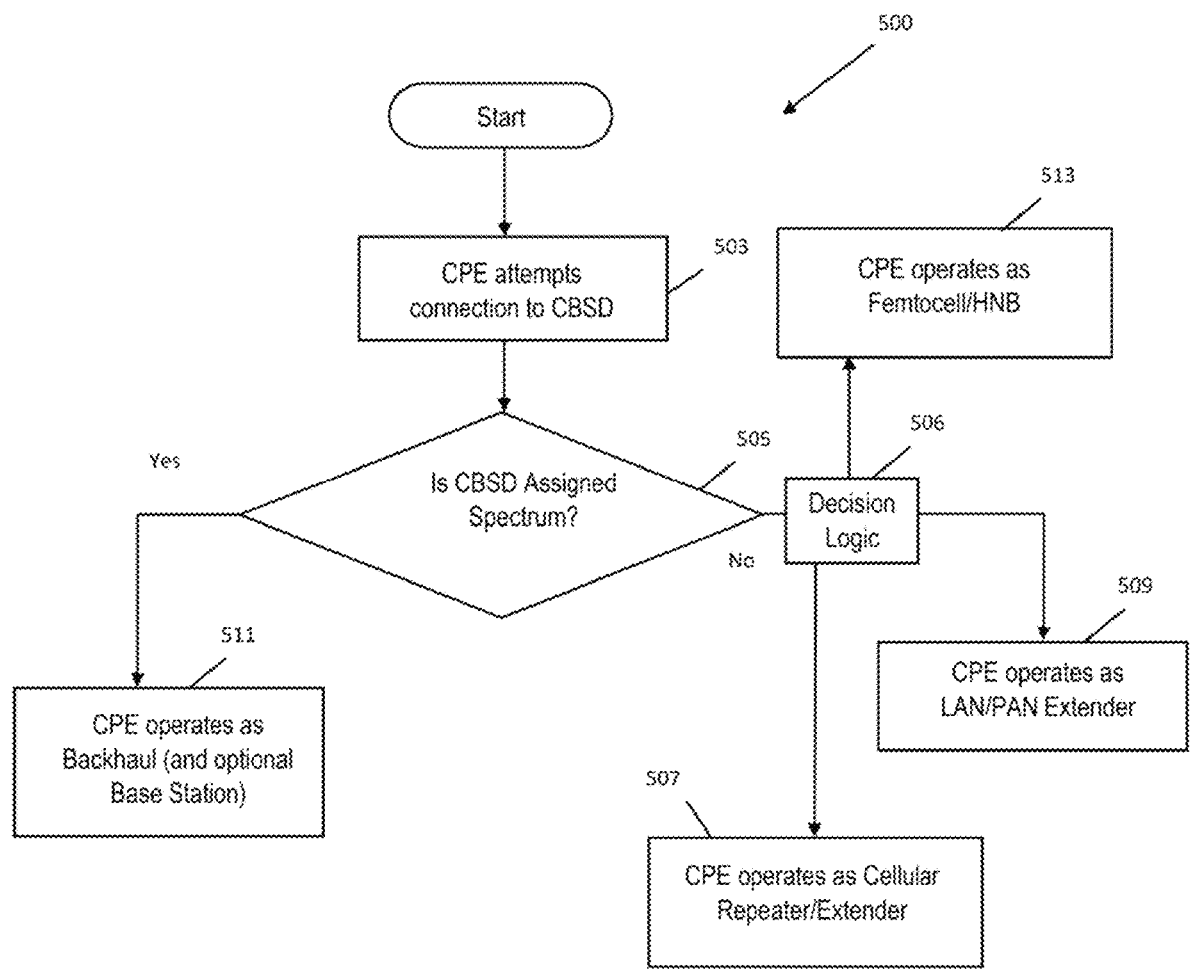

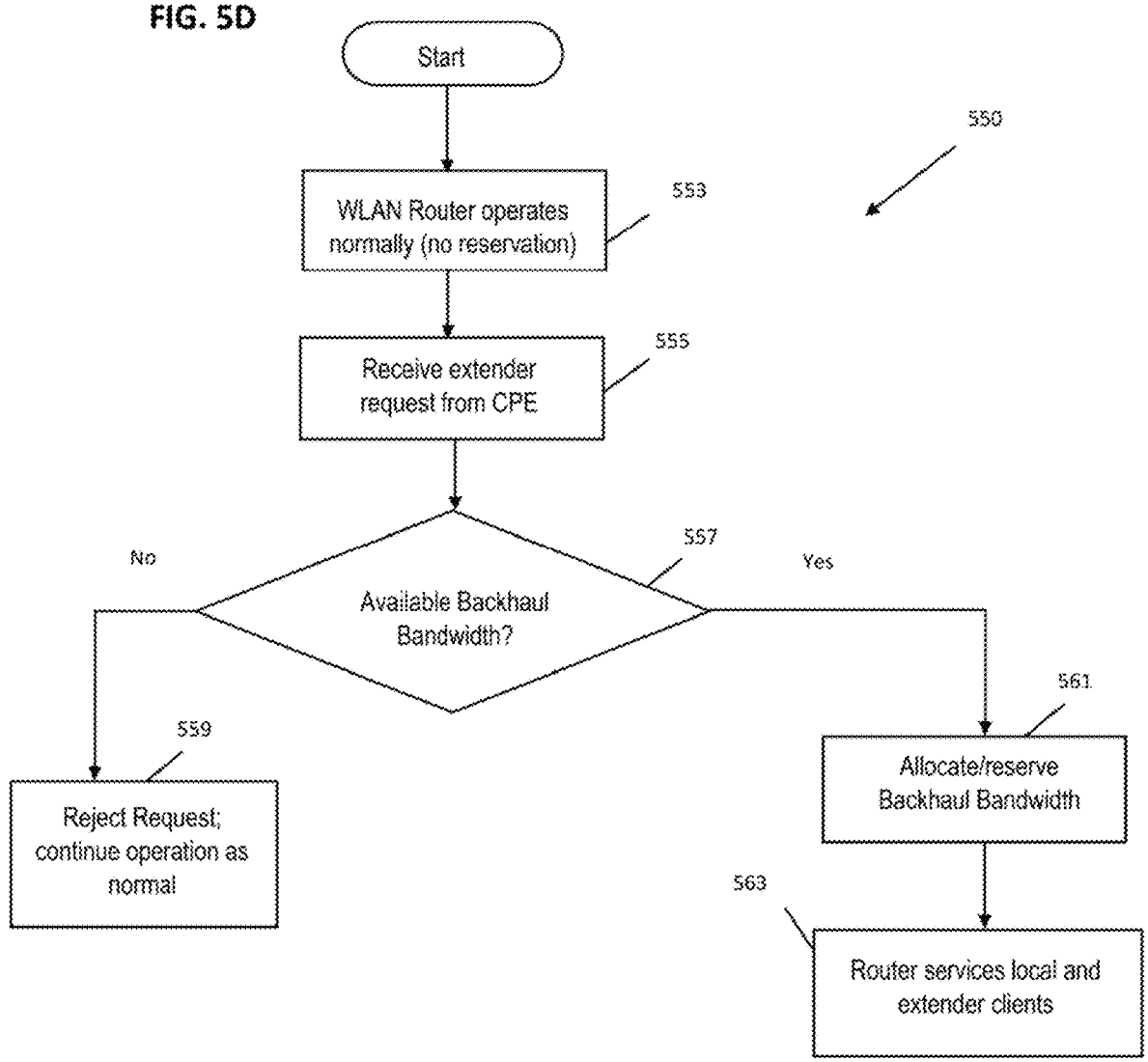

MULTI-MODE WIRELESS APPARATUS AND METHODS OF OPERATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for utilizing premises devices such as for example those providing connectivity via quasi-licensed Citizens Broadband Radio Service (CBRS) technologies, for additional or alternate functions such as extending range of other types of wireless systems.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

TABLE 2-continued

| Frequency range | Type | Center frequency | Availability | Licensed users |
|---|---|---|---|---|
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing)

function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Idle CBRS CPE—

In the extant CBRS architectures, the aforementioned Spectrum Access System (SAS) serves as an automated frequency coordinator across the CBRS band(s). Particularly, CBRS systems have a frequency coordination model wherein a centralized SAS node performs frequency coordination and assignment to Citizen Broadband Radio Service Devices (CBSDs), and such assignments or "grants" may be revoked in favor of e.g., incumbent or other uses. While the role of the SAS is to optimize frequency uses and allow maximum capacity for PAL and GAA frequency bands, sometimes it cannot assign a frequency to a CBSD device connected to the network due to, for example, high co-channel or adjacent interference. In such cases, a Consumer Premises Equipment (CPE) such as a Fixed Wireless Access (FWA) device associated with the CBSD cannot receive any signal from the CBSD, and hence the CPE becomes idle, and automatically terminates its connection with the CBSD. As such, the CPE is effectively useless in terms of providing any meaningful utility to the customer (or service provider). This can lead to, inter alia, significant user frustration and loss of "experience," as well as loss of overall network capacity for the service provider. The customer/user may also perceive the CPE (and supporting service provider) as unreliable.

Accordingly, what is needed are improved apparatus and methods for re-purposing or utilization of such "stranded" or isolated CPE such that at least some useful application of the CPE can be made during such periods of disconnection or isolation. Ideally, such improved apparatus and methods would enable provision of useful services to the customer or user at least during such periods.

SUMMARY

The present disclosure addresses the foregoing needs by providing, inter alia, methods and apparatus for multi-mode service provision within a served premises.

In one aspect of the disclosure, a method of operating a multi-mode served CPE (such as e.g., that used with a CBRS FWA device) with a wireless network is described. In one embodiment, the method includes utilizing the CPE and associated FWA device as a WLAN extender; e.g., in conjunction with an existing Wi-Fi router which is backhauled by a different backhaul modality serving the premises (e.g., DSL, DOCSIS modem or optical fiber), during times when the FWA is unable to communicate with a serving CBSD.

In another embodiment, the method includes utilizing the CPE and associated FWA device as a cellular (e.g., 3GPP LTE/LTE-A/5G NR) extender; e.g., in conjunction with an existing eNB or gNB of a service provider and which is backhauled by a separate backhaul modality (e.g., optical fiber or mmWave system).

In another aspect, a method for extending range of the signal of wireless access devices (e.g., Wi-Fi router or LTE eNB/gNB) is disclosed. In one embodiment, the method includes using an installed CPE (and associated FWA device) to extend wireless signals from the wireless access device to coordinate with the corresponding access device to enable functioning as a repeater for the access device using the same or different frequencies.

In one variant, the method includes configuring the CPE to work as a Wi-Fi signal extender to extend the Wi-Fi signal broadcast from a Wi-Fi router inside of the served premises or venue to the outside of the premises or venue via the FWA antenna system (e.g., roof-mounted antenna element(s)) via unlicensed (e.g., 2.5 GHz or 5 GHz) emissions. In one implementation, the CPE is connected to the Wi-Fi router via a cable link and network protocol (e.g., Ethernet or similar), and the CPE and its connected FWA use the Wi-Fi router (and its backhaul, such as DSL, optical fiber, etc.) as its backhaul to external networks such as the Internet. In one particular implementation, the router exchanges the SSID and operating channels with the CPE; the CPE broadcasts the same SSID used by the Wi-Fi router. The frequencies used by the CPE (and connected FWA) may be the same as those used by the router (employing e.g., collision detection mitigation mechanisms as prescribed in the Wi-Fi standards), or different frequencies may be used.

In another variant, the method includes configuring the CPE to work as an LTE signal repeater to extend the LTE signal connectivity with a serving eNB/gNB. In one implementation, the CPE measures all base station and sector signals received at the CPE (i.e., FWA receiver), and selects the base station and/or sector that has the best putative performance (e.g., highest RSRP, or best measured data performance such as vi an indigenous iPerf process executing on the CPE or on a connected mobile device).

In another implementation, the base station allocates specified air interface and resource to the CPE, for the transmission and reception of the data to/from the UEs inside the prescribed premises or venue.

In another variant, the method configures the CPE to work as CBRS base station for all cellular client devices or UEs (e.g., smartphones or tablets associated with a prescribed premises or venue. The CPE (via the connected FWA)

communicates to a serving CBSD for the transmission or reception of data to the e.g., cellular client devices of the prescribed premises or venue, which may be either indoor or outdoor.

In another aspect of the disclosure, a method of operating a premises wireless apparatus is disclosed. In one embodiment, the method includes: utilizing a first wireless interface of the premises wireless apparatus as a wireless backhaul for one or more computerized devices of the premises to at least one base station; and based at least on a loss or incipient loss of connection on the first wireless interface during said utilizing, causing the premises wireless apparatus to operate as an extension access point for at least one of the one or more computerized devices, the operation as an extension comprising utilizing a second wireless interface of the premises wireless apparatus.

In one variant of the method, the utilizing the first wireless interface comprises transmitting signals within a frequency range between 3.550 and 3.70 GHz inclusive, and wherein the at least one base station comprises a CBRS (Citizens Broadband Radio Service) compliant CBSD (Citizens Broadband radio Service Device).

In another variant, the at least one base station and the premises wireless apparatus utilize 3GPP-compliant 5G NR-U (Fifth Generation New Radio—Unlicensed) air interface technology for said backhaul.

In a further variant, the causing the premises wireless apparatus to operate as an extension access point for at least one of the one or more computerized devices, the operation as an extension comprising utilizing a second wireless interface of the premises wireless apparatus, comprises configuring the premises wireless apparatus to extend the signals from an IEEE Std. 802.11-compliant wireless access point (AP) or router to one or more areas outside of a structure on the premises via a one or more antenna elements mounted externally to or on the structure.

In one implementation thereof, the premises wireless apparatus is connected to the wireless AP or router via a cable link, and the method further comprises using the AP or router to access the Internet via a service provider modem, and the method further includes: sending data relating to at least one of (i) an SSID, or (ii) one or more operating channels, to the premises wireless apparatus; and utilizing the at least one of the SSID or one or more operating channels in during transmissions from the premises wireless apparatus.

In another variant of the method, the causing the premises wireless apparatus to operate as an extension access point for at least one of the one or more computerized devices, the operation as an extension comprising utilizing a second wireless interface of the premises wireless apparatus, comprises configuring the premises wireless apparatus to extend the signals from an IoT gateway apparatus or router associated therewith to one or more areas outside of a structure on the premises via a one or more antenna elements mounted externally to or on the structure in order to serve one or more IoT sensors mounted external to the structure.

In yet a further variant, the method further comprises receiving from a network process in data communication with the premises wireless apparatus, data indicative of the loss or incipient loss of connection on the first wireless interface during said utilizing prior to any actual loss of the connection. In one implementation, the received data indicative of the loss or incipient loss of connection on the first wireless interface during said utilizing is transmitted from the network process to the premises wireless apparatus via the connection prior to the actual loss thereof.

In another implementation, the received data indicative of the loss or incipient loss of connection on the first wireless interface during said utilizing is transmitted from the network process to the premises wireless apparatus in response to a spectrum grant withdrawal by a CBRS (Citizens Broadband Radio Service) SAS (spectrum allocation system).

In another variant of the method, the method further comprising utilizing premises wireless apparatus to transmit or receive signals to/from at least one mobile client device at the premises prior to said loss of said connection, the transmission or reception of the signals to/from the at least one mobile client device conducted according to a 3GPP LTE (Long Term Evolution) or 5G NR (New Radio) air interface technology standard and utilizing an unlicensed or quasi-licensed spectrum.

In another embodiment, the method comprising: utilizing a first wireless interface of the premises wireless apparatus as a wireless backhaul for one or more computerized devices of the premises to at least one base station; and based at least on a loss or incipient loss of connection on the first wireless interface during said utilizing, causing the premises wireless apparatus to operate as an extension access point for a cellular base station with which the premises wireless apparatus can establish a connection.

In one variant of this embodiment, the at least one base station comprises a CBRS (Citizens Broadband Radio Service) compliant CBSD (Citizens Broadband radio Service Device); the CBSD and the premises wireless apparatus utilize 3GPP-compliant LTE or 5G NR (Fifth Generation New Radio) air interface technology for said backhaul, the CBSD and premises wireless apparatus operating within a frequency range between 3.550 and 3.70 GHz inclusive for said backhaul, and the cellular base station and the premises wireless apparatus utilize 3GPP-compliant LTE or 5G NR (Fifth Generation New Radio) air interface technology operating within a licensed cellular band for said connection.

In one implementation, the method further comprises using the premises wireless apparatus to measure a plurality of signals received from a plurality of respective cellular base stations, and selecting the at least one base station for said extension based at least on one or more parameters associated with the plurality of signals received.

For instance, the selecting can be based at least on the one or more parameters comprises selecting the at least one base station based on highest RSRP.

In another implementation, the selecting the at least one base station causes the at least one base station to allocate specified resources to the premises wireless apparatus.

In another aspect, a computerized premises wireless apparatus configured to operate in a plurality of functional modes is disclosed. In one embodiment, the premises wireless apparatus comprising: a first wireless interface; a second wireless interface: processor apparatus in data communication with the first wireless interface and the second wireless interface: and storage apparatus in data communication with the processor apparatus and comprising a storage medium, the storage medium comprising at least one computer program.

In one variant, the at least one computer program is configured to, when executed by the processor apparatus: enable operation of the computerized premises wireless apparatus in a first mode, the first mode comprising a mode wherein the first wireless interface is used as a backhaul for the computerized premises wireless apparatus; and enable operation of the computerized premises wireless apparatus in a second mode, the second mode comprising a mode wherein the first wireless interface is inoperative as a backhaul for the computerized premises wireless apparatus, and the second wireless apparatus is used as an extension for a wireless-enabled device in data communication with the computerized premises wireless apparatus.

In one implementation, the first wireless interface comprises a 3GPP-compliant Long Term Evolution (LTE) or 5GNR (New Radio) wireless interface configured to enable operation within a frequency range between 3.550 and 3.70 GHz inclusive for communication with a CBRS (Citizens Broadband Radio Service) compliant CBSD (Citizens Broadband radio Service Device) acting as said backhaul; the wireless-enabled device comprises a premises wireless LAN (WLAN) router operating in accordance with IEEE Std. 802.11 and operating in an unlicensed frequency band; and the second wireless interface comprises an interface operating in accordance with IEEE Std. 802.11 in the unlicensed frequency band.

In another implementation, the first wireless interface comprises a 3GPP-compliant Long Term Evolution (LTE) or 5GNR (New Radio) wireless interface configured to enable operation within a frequency range between 3.550 and 3.70 GHz inclusive for communication with a CBRS (Citizens Broadband Radio Service) compliant CBSD (Citizens Broadband radio Service Device) acting as said backhaul; the wireless-enabled device comprises at least one 3GPP-compliant Long Term Evolution (LTE) or 5G NR (New Radio) cellular base station operating in a licensed frequency band; and the second wireless interface comprises a 3GPP-compliant Long Term Evolution (LTE) or 5G NR (New Radio) interface operating in the licensed band.

In yet another implementation, the first wireless interface comprises a 3GPP-compliant Long Term Evolution (LTE) or 5G NR (New Radio) wireless interface configured to enable operation within a frequency range between 3.550 and 3.70 GHz inclusive for communication with a CBRS (Citizens Broadband Radio Service) compliant CBSD (Citizens Broadband radio Service Device) acting as said backhaul; the wireless-enabled device comprises at least one 3GPP-compliant Long Term Evolution (LTE) or 5G NR (New Radio) cellular base station operating in a licensed frequency band; and the second wireless interface comprises a 3GPP-compliant Long Term Evolution (LTE) or 5G NR (New Radio) interface operating in an unlicensed or quasi-licensed band.

In a further implementation, the first wireless interface comprises a 3GPP-compliant Long Term Evolution (LTE) or 5G NR (New Radio) wireless interface configured to enable operation within a frequency range between 3.550 and 3.70 GHz inclusive for communication with a CBRS (Citizens Broadband Radio Service) compliant CBSD (Citizens Broadband radio Service Device) acting as said backhaul; the wireless-enabled device comprises at least one 3GPP-compliant Long Term Evolution (LTE) or 5G NR (New Radio) cellular base station operating in a licensed frequency band; and the second wireless interface comprises a 3GPP-compliant Long Term Evolution (LTE) or 5G NR (New Radio) interface operating in the licensed band.

In another aspect, a network architecture for delivery of wireless data to at least one fixed wireless receiver apparatus (e.g., CBRS FWA) is disclosed. In one embodiment, the network architecture includes: a plurality of wireless base stations; a computerized network controller in data communication with the plurality of base stations; at least one fixed wireless receiver apparatus; at least one computerized premises device in data communication with the at least one fixed wireless receiver; at least one wireless access point or router; and a computerized backhaul premises in communication with wireless access point. In one variant, the fixed wireless receiver apparatus includes a CPE device which is logically communicative with one of the plurality of base stations or at least one wireless access point, extending the signal range of the plurality of the base stations or the at least wireless access point.

In another aspect, a wireless premises device is disclosed. In one embodiment, the device includes a CBRS (Citizens Broadband Radio Service)-compliant FWA that is capable of data communication with one or more 3GPP compliant eNB or gNB or CBSD/xNB within CBRS frequency bands, and with an 802.11 compliant Wi-Fi access point or router. In one embodiment, the FWA/CPE includes client manager/logic for, inter alia, configuring it in one of a plurality of operating modes; e.g., for a repeater mode, an extender mode, and a base station mode.

In one variant, the FWA apparatus comprises a premises device associated with a network operator (e.g., MSO) that is configured to communicate wirelessly with one or more CBSD/xNB devices to obtain high-speed data services from the CBSD/xNB and the MSO. In one implementation, the FWA apparatus is configured to operate at a sufficiently high power level so as to be classified as a Category B CBSD CBRS device, and is mounted on the user's premises so as to enable the aforementioned backhaul for WLAN or wireline interfaces within the premises.

In another variant, the FWA apparatus comprises a premises device associated with a network operator (e.g., MSO) that is configured to communicate via a cable link to one wireless access point to obtain high-speed data services when its primary backhaul is disabled or inoperative, and uses the wireless access point to connect to a backhaul via the cable link.

In one implementation, the FWA apparatus is configured to extend the Wi-Fi signal from the inside of the user's premises to the outside of user's premises.

In yet another variant, the FWA apparatus comprises a premises device operated by a network operator (e.g., MSO) that is configured to communicate wirelessly with one or more of a plurality of MNO-operated cellular base stations, obtaining high-speed data services therefrom one or more base stations, and providing high-speed data service to the client devices at the user's premises using the base stations as backhaul.

In an additional aspect of the disclosure, computer readable apparatus is described. In one embodiment, the apparatus includes a storage medium configured to store one or more computer programs, such as a multi-mode selection module of the above-mentioned FWA. In another embodiment, the apparatus includes a program memory or HDD or SDD on a computerized network controller device, such as an MSO DP (domain proxy) or network controller server.

In another aspect, methods and apparatus for allocating functionality based on available bandwidth on a backhaul is disclosed. In one embodiment, the methods and apparatus are configured to determine an available type and/or capacity of backhaul which is then currently operational, and based at least on the determination, select one or more functional modes of the CPE for operation, including utilization of the available backhaul. In one variant, the available backhaul is a lower-bandwidth connection such as DSL, and the methods and apparatus are configured to select an IoT or WLAN mode of operation for the CPE.

In a further aspect, methods and apparatus for extending wireless coverage area using a CPE are disclosed. In one embodiment, the CPE includes a fixed wireless access apparatus of a premises, and the extension for wireless coverage is for one of more of (i) existing WLAN coverage; (ii) existing IoT coverage, and/or (iii) existing cellular coverage.

In another aspect, methods and apparatus for extending licensed wireless coverage area using a CPE and unlicensed spectrum are disclosed. In one embodiment, the CPE includes a fixed wireless access apparatus of a premises, and the extension for wireless coverage is for existing cellular coverage that utilizes licensed spectrum; unlicensed or quasi-licensed spectrum is used for the "last mile" of extension (i.e., by the CPE) at the premises.

In another aspect, methods and apparatus for providing premises backhaul and unlicensed/quasi-licensed mobile device coverage are disclosed. In one embodiment, an FWA CPE is used to both establish a wireless backhaul between the premises and one or more serving base stations, and provide premises coverage for mobile devices such as 3GPP-compliant UE's of the customer. In one variant, both the backhaul and the premises coverage utilize CBRS spectrum granted by a SAS. In another variant, the backhaul uses CBRS spectrum, and the premises coverage uses unlicensed spectrum (e.g., NR-U or other).

These and other aspects shall become apparent when considered in light of the disclosure provided herein.

BRIEF DESCRIPTION OF THE DRAWINGS

FIG. 5 is a logical flow diagram of the exemplary embodiment of a general method for operating a multi-mode CPE according to the present disclosure.

FIG. 5D is a logical flow diagram of the exemplary embodiment of a general method for operating an extender-enabled WLAN router or AP according to the present disclosure.

Figure 1:
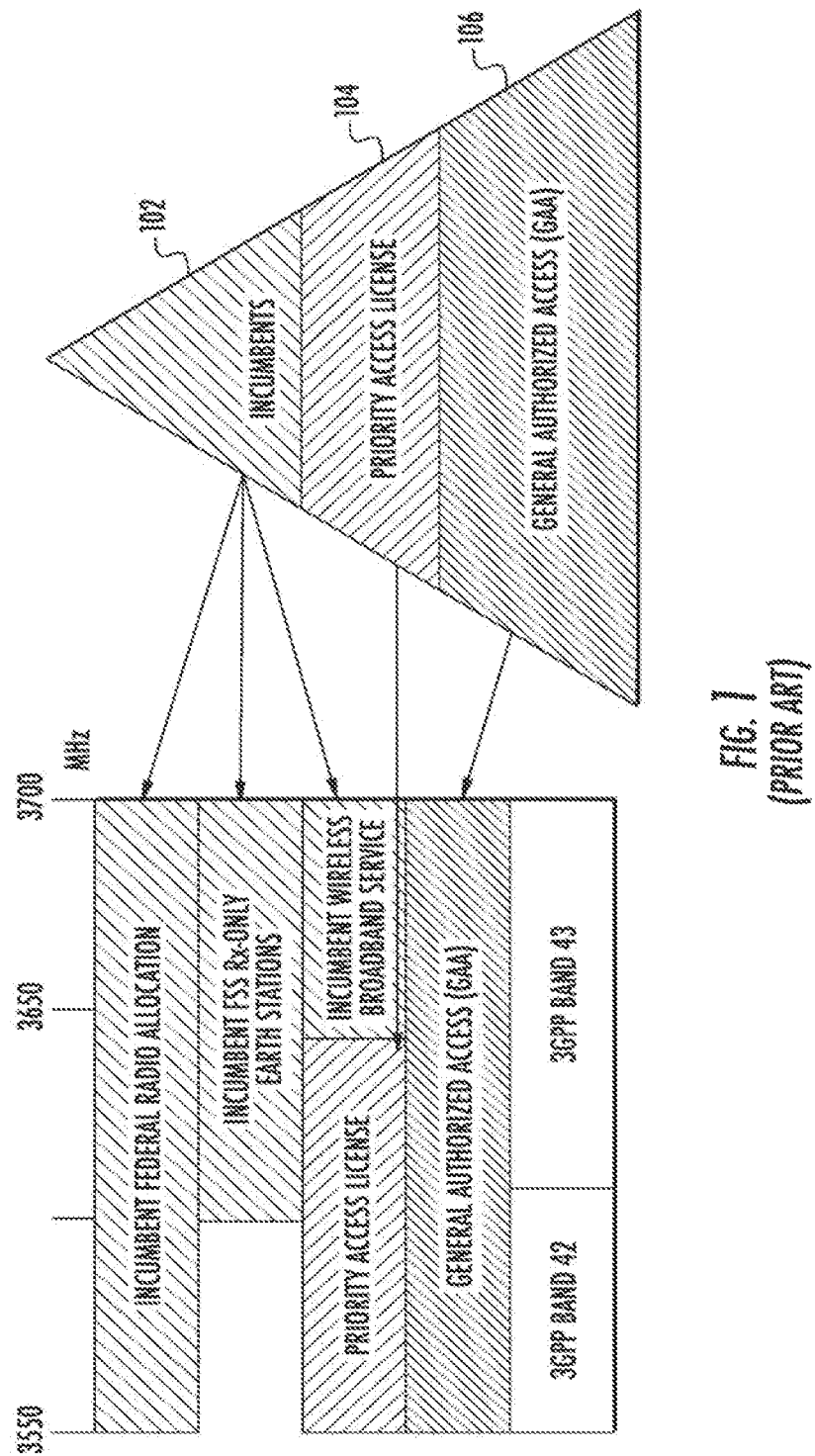
FIG. 1 is a graphical illustration of prior art CBRS (Citizens Broadband Radio Service) users and their relationship to allocated frequency spectrum in the 3.550 to 3.700 GHz band.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/b a or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3GPP/3GPP2, HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one salient aspect of the present disclosure, methods and apparatus are provided that enable a CPE (such as for instance an FWA apparatus) to operate in different capacities in different wireless networks with which it can connect. In one embodiment, the methods and apparatus utilize quasi-licensed (e.g., CBRS) wireless spectrum as a primary backhaul to a serving base station (e.g., CBRS CBSD), and may also operate in conjunction with (i) a premises Wi-Fi router; (ii) one or more 3GPP base stations (e.g., 5G gNB or 4G eNB) within wireless range of the CPE; and (iii) an IoT gateway or node, for delivery of services to a number of users or subscriber premises.

In one variant, the CPE operates normally as a CBRS FWA, with backhaul to a serving CBSD. When that connection fails (due to e.g., spectrum withdrawal by a SAS), the CPE itself (or under command of a network controller) assumes a secondary role or mode, such as in a Wi-Fi "extender" capacity. In this mode, the CPE extends the Wi-Fi signal broadcast from an extant router or access point inside a prescribed premises or venue, such as a house, an apartment building, conference center or hospitality structure (e.g., hotel), to the outside of the premises or venue, thereby giving the Wi-Fi signals enhanced range and serving more users (which may or may not be associated with the premises, depending on configuration). The CPE utilizes a second backhaul via the router/AP (e.g., DSL modem, DOCSIS modem, mmWave system, fiber drop, etc.). In this capacity, the Wi-Fi router/AP may also reserve certain backhaul capacity for the transmission/reception of CPE data to/from the backhaul.

Similarly, in another variant, the CPE may operate as an IoT access point or gateway extender, in generally similar fashion to the WLAN extender above. In that IoT signals are typically short range (e.g., PAN, with much less range than WLAN or cellular), the CPE can extend PAN coverage within the premises (and even to distant portions thereof) via e.g., the roof-mounted FWA apparatus. This functionality is particularly useful for, e.g., large industrial or agricultural premises with numerous IoT sensors (e.g., for pumps, valves, electrical devices, etc.) to enable connectivity therewith, including obviation of intermediary nodes.

In yet another variant, the CPE is configured to operate as a cellular (e.g., 3GPP LTE or 5G NR) signal repeater for a base station (e.g., eNB or gNB); e.g., to enhance base station coverage area including on the premises. The CPE measures available base station/sector signals, and selects one or more base stations/sectors with the highest measured signal. The base station may also be configured to reserve capacity for the delivery/reception of data to cellular-enabled end user devices through the CPE, such as via a prior existing cooperation agreement between the MSO and an MNO.

In the foregoing variants, the CPE may also operate as a CBRS base station for e.g., 3GPP-enabled devices of the premises (i.e., within an NR-U or CBRS band), with the service backhauled by e.g., a CBSD serving the CPE.

Moreover, the foregoing functions may be used contemporaneously (in certain compatible combinations) even when the primary backhaul is operative.

Notably, by providing such alternative functionality to the CPE, including in some cases obviating "truck rolls" by leveraging the specific attributes of the MSO and non-MSO infrastructure serving or proximate with the premises. In some scenarios, such as in a strong interference limited environment or in a crowded area where the provision of primary backhaul to the end user is not possible due to the unavailability of the spectrum, the CPE is configured to assume one or more alternative role (such as based on user preferences, and/or network controller inputs) to provide service to the end users.

The ability of the MSO, MNO or other entity to use the enhanced CPE in different capacities is also advantageously provided, including during the initial registration or installation process in which the CPE is unable to establish its primary backhaul (e.g., due to unavailability of SAS-allocated spectrum).

Detailed Description of Exemplary Embodiments

Exemplary embodiments of the apparatus and methods of the present disclosure are now described in detail. While these exemplary embodiments are described in the context of the previously mentioned CPE and wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Pro-*

*tocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Further, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) or Multefire technology.

Other features and advantages of the present disclosure will immediately be recognized by persons of ordinary skill in the art with reference to the attached drawings and detailed description of exemplary embodiments as given below.
Multiple—Mode CPE Architecture—

Figure 3:
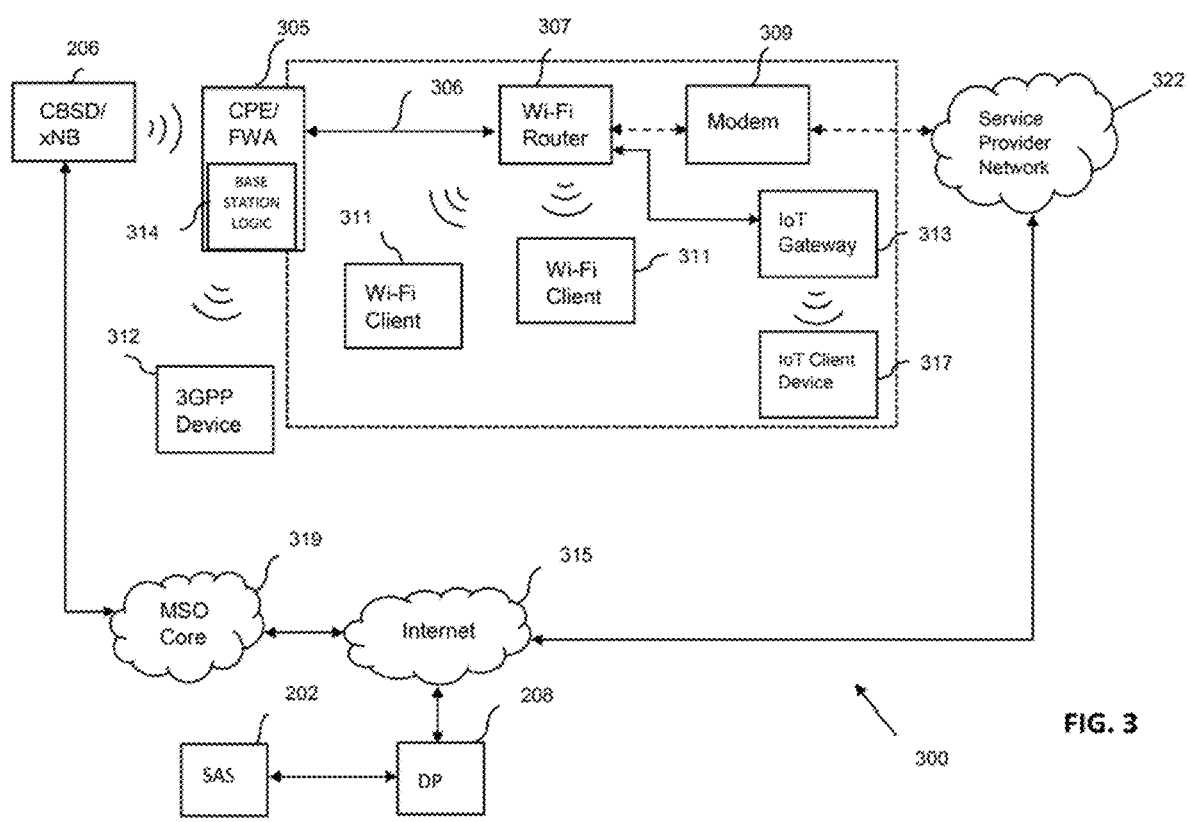
FIG. 3 is a block diagram illustrating a first exemplary embodiment of a multi-mode CPE configured to operate with CBSD signals, including as a CBRS base station, according to the present disclosure.

FIG. 3 shows block diagram 300 illustrating one embodiment of a multi-mode CPE architecture according to the present disclosure. In this architecture, the multi-mode CPE/FWA 305 is connected wirelessly to a serving base station (e.g., CBRS CBSD/xNB) 206 for provision of primary backhaul from the premises to the serving (e.g., MSO) network, not shown. The CPE 305 may also be configured to operate as a local CBRS base station, such as for the delivery or reception of data to or from one or more 3GPP-enabled client devices 312, via logic 314 resident with the CPE. The 3GPP user devices 312 can be inside or outside of the prescribed premises or venue (e.g., houses, apt. building, hospital, etc.).

Figure 2:
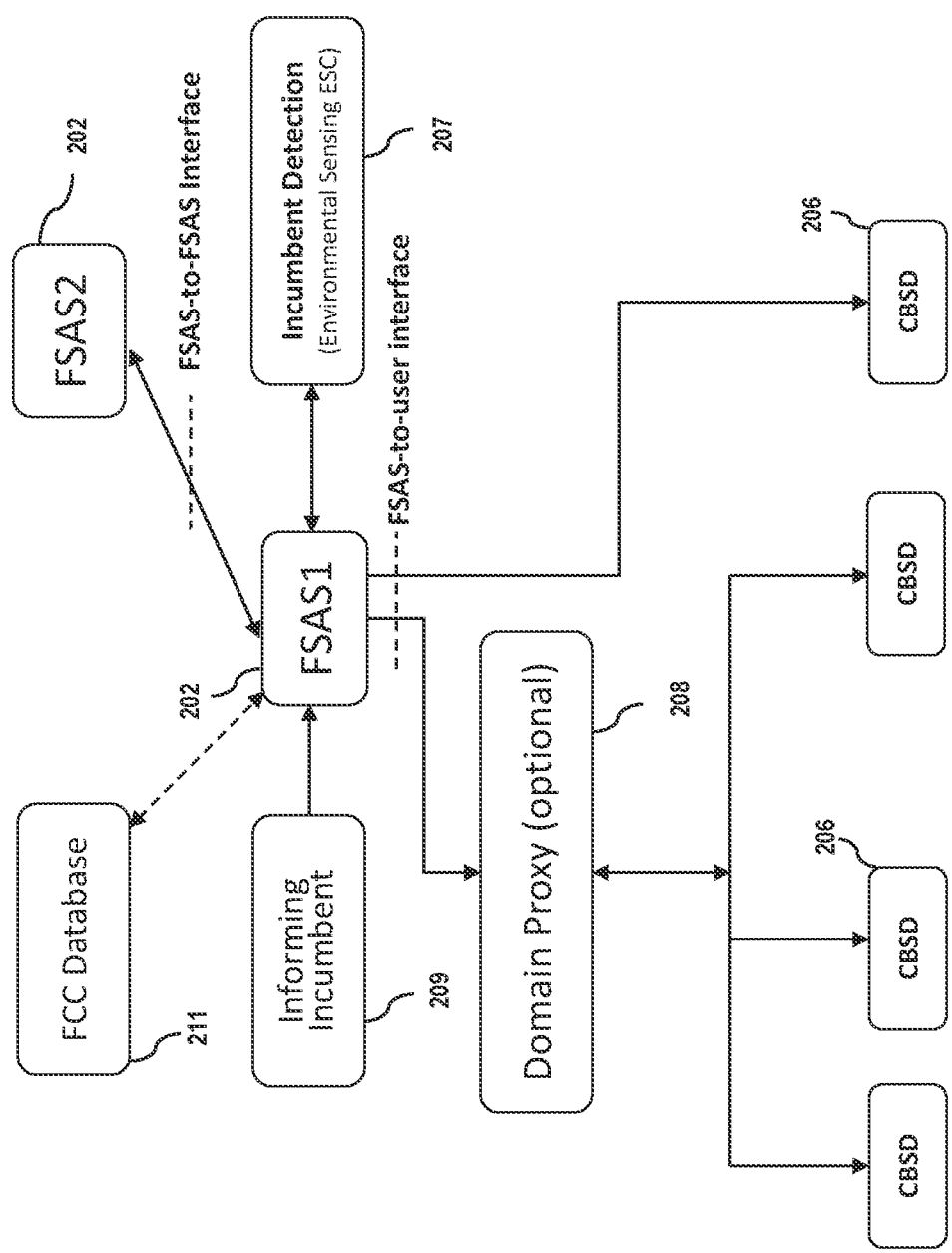
FIG. 2 is a block diagram illustrating a general CBRS system, SAS and DP architecture according to the prior art.
Figure 2A:
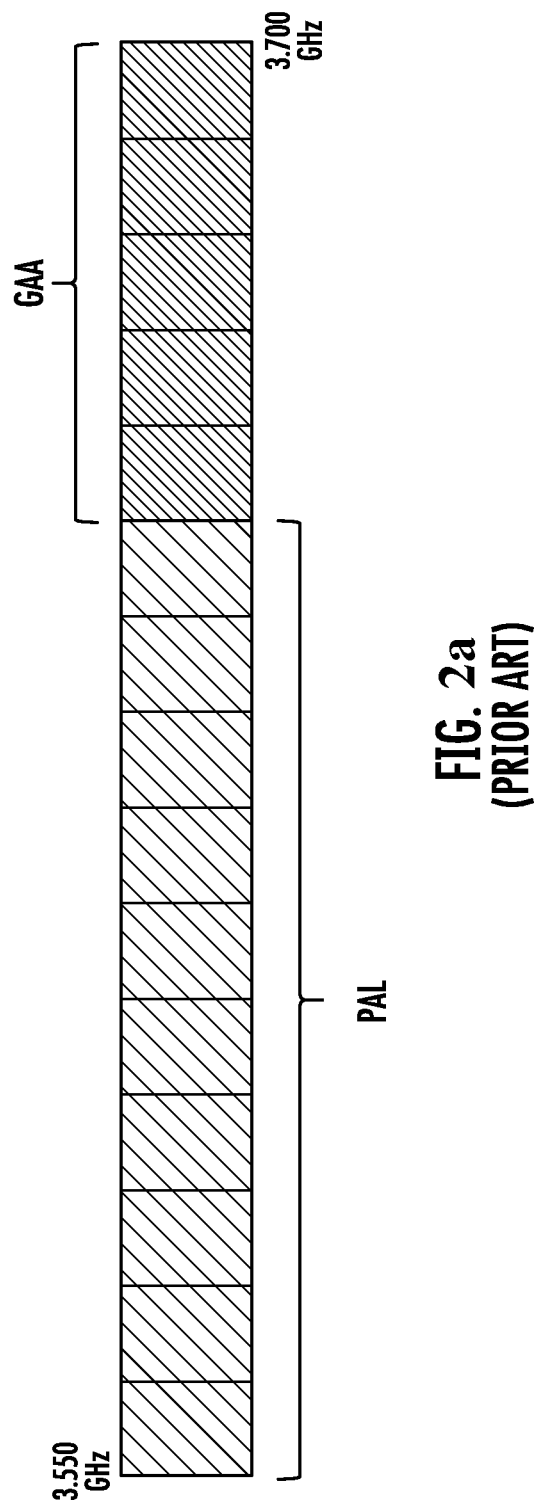
FIG. 2A is a graphical representation of allocations for PAL versus GAA users within the frequency bands of FIG. 1.

In operation, the CPE/FWA 305 establishes the primary backhaul to the CBSD 206 via spectrum allocated for this purpose; e.g., via registration with a SAS (FIG. 2). In one variant, the same spectrum is utilized for local communication with the served user devices 312, albeit at lower EIRP than that used to communicate with the serving CBSD(s) 206.

In another variant, different spectrum—e.g., NR-U, ISM, C-Band, mmWave (e.g., 24-100 GHz) or other—is used as the basis for CPE-to-user device communication. This utilization may also be according to a prescribed hierarchy or prioritization scheme, such as one which seeks to minimize cost of connection/operation to the user, seeks use of the most ubiquitous air interface/spectrum first, and/or other criteria. For instance, it is recognized that many user devices such as mobile devices (e.g., smartphones, tablets, etc.) are capable of both Wi-Fi and 3GPP (e.g., LTE) based communication, in that they include radios for each. For such devices, the cellular interface will include a SIM card, and depending on the logic connection manager (e.g., application operative to execute on the mobile device), the mobile device may selectively utilize signals/protocols available to it. For instance, in one variant, the presence or absence of a first type of signal at the premises (e.g., Wi-Fi beacons within a prescribed ISM or unlicensed frequency range being emitted by the CPE acting as a WLAN repeater) will cause the mobile device to connect using that air interface protocol and spectrum. Conversely, if the first type of signal is not available (e.g., the CPE is acting as a cellular repeater), but a second type of signal within the connection manager hierarchy is available (e.g., the device can locate a sufficiently strong cellular signal with the assistance of a CPE acting as a cellular repeater), the mobile device will receive service from the cellular base station via the CPE repeater.

It will also be recognized that similar logic may be inserted into the various embodiments of the CPE apparatus described herein. For example, the CPE apparatus may, upon loss of its primary wireless backhaul connection to a serving CBSD, opt to first act as a WLAN repeater for the premises within an ISM or other unlicensed band (since that is ostensibly the most ubiquitous and lowest cost option for the users at the premises), and thereafter act as a cellular repeater for cellular-enabled devices at or near the premises (whether in an unlicensed, quasi-licensed or licensed band depending on limitations relating thereto), such as when no viable WLAN connections are established within a prescribed period of time. Numerous other permutations of the foregoing logic (on both the CPE and mobile device sides) will be appreciated by those of ordinary skill given the present disclosure.

Returning again to FIG. 3, the physical connection 306 between the CPE 305 and Wi-Fi router 307 in this configuration exists, and is utilized to service the premises backhaul (note dotted lines for secondary backhaul modem 309, indicating non-usage in this configuration). The Wi-Fi router 307 is connected directly or indirectly to the MSO network 319 via the cable modem 309, such as via a DOCSIS, DSL, or optical fiber modem 309, such as via a separate service provider network 322 that ultimately connects to the MSO network 319. The Wi-Fi client devices 311 are wirelessly connected to the router device 307.

Similarly, the architecture 300 of FIG. 3 includes an IoT (Internet of Things) gateway function 317—whether standalone as shown, or integrated with another device such as the router 307—to provide the premises with IoT functionality including Internet connectivity.

For CBRS related functions, the Spectrum Access System (SAS) 202 is connected to the Internet via the Domain Proxy 208, and the MSO network can access the SAS for spectrum grants, registration, etc. As previously described, the role of the SAS is to manage and assign spectrum on a dynamic and as-needed basis across incumbent, PAL and GAA users. The base station logic 314 manages all the control signaling and operation the CPE/FWA device 305 to work as a CBRS base station (as well as a CBRS FWA).

Figure 4A:
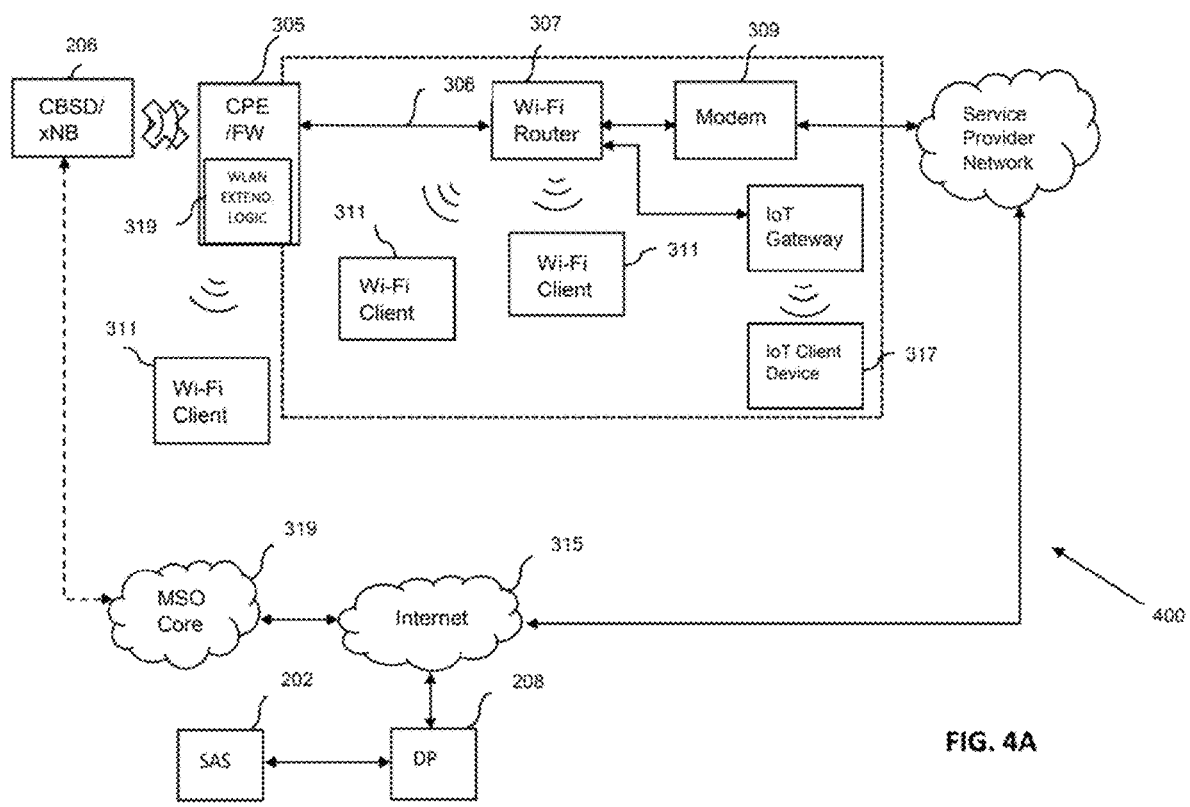
FIG. 4A is a block diagram illustrating a second exemplary embodiment of a multi-mode CPE configured as a premises Wi-Fi extender, according to the present disclosure.

FIG. 4A shows a block diagram 400 illustrating one embodiment of a second mode of operation for the CPE/FWA 305, wherein it is configured to operate as a Wi-Fi extender according to the present disclosure. In this configuration, the CPE/FWA 305 operates to extend the Wi-Fi signal broadcasted from the router 307; e.g., from inside a prescribed premises or venue (e.g., a house or apt building) to the outside of the premises or venue, such as when the primary backhaul connection is lost due to e.g., SAS spectrum withdrawal or the presence of a high-interference environment within which the CBSD and/or CPE/FWA is/are unable to operate (denoted by "X"). As shown, the CPE/FWA 305 is connected to the Wi-Fi router 307 via the cable link 306, and the router 307 utilizes its "secondary" backhaul modem 309 to provide Internet connectivity to the premises, including for the extender 305 and its Wi-Fi clients 311 via the WLAN extender logic 319 of the CPE/FWA 305 (as well as for the IoT gateway function 317).

In one variant, after the CPE/FWA 305 enters WLAN extender mode (such as being triggered by any number of different events or criteria, such as low or zero iPerf readings on the primary backhaul for an extended period, affirmative communication from the CBSD of impending loss/withdrawal, communication from a network controller in logical communication with the CPE/FWA, etc.), it signals the router 307 of the same, and the Wi-Fi router 307 will exchange data which may include the router's Service Set Identifier (SSID) and current operating channel(s) with the CPE 305. The CPE 305 will store the data and start broadcasting the same SSID as that of the router 307, which depending on the CPE/FWA placement may include both outdoors and indoors areas of the premises. In some variants, depending on the co-channel or adjacent interference level, the CPE/FWA can use the same channel(s) as the router 307, or alternatively different channels than those of the router 307. Notably, various versions of IEEE Std. 802.11 also include spectrum access and collision management mechanisms, such that Wi-Fi clients 311 can select and utilize the best "AP" (router or CPE/FWA) for their particular circumstance. The client devices 311 of the CPE/FWA will detect the broadcast SSID, and start communicating with the CPE 305 for the reception or delivery of data from/to the network.

It will be appreciated that depending on configuration, the CPE/FWA 305 may operate in either a "pass through" mode, wherein it basically acts only as another RF front end for the router (e.g., Layer 1 functions only), or an "endpoint" mode, wherein the CPE/FWA is a separate Layer 2/3 node for purposes of communication with the router. It will also be appreciated given the present disclosure that any suitable (e.g., Layer 2) protocol may be used to enable communication between the CPE/FWA and router.

Figure 4B:
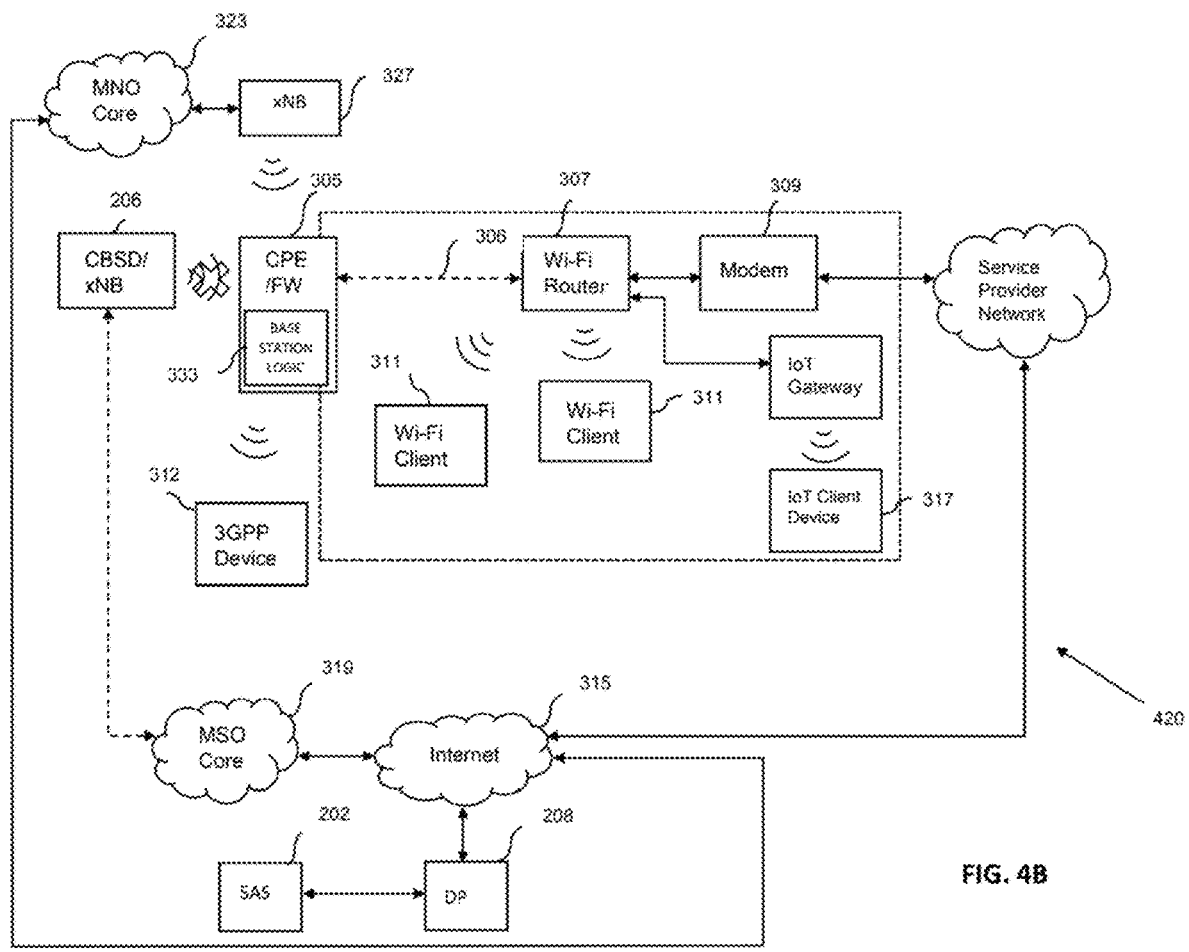
FIG. 4B is a block diagram illustrating a third exemplary embodiment of a multi-mode CPE configured as a 3GPP (e.g., LTE) signal repeater for a base station (e.g., xNB) according to the present disclosure.

FIG. 4B shows a block diagram of another architecture 420 illustrating use of the CPE/FWA 305 operating as a 3GPP (e.g., LTE or 5G NR) signal repeater according to the present disclosure. In this configuration, the CPE 305 extends the 3GPP signals of one or more cellular base stations within signal range of the CPE/FWA to the premises (including, for example, enhancement of existing weak cellular signal at the premises due to e.g., topography, range, etc.) As shown in FIG. 4B, in this mode, the CPE 305 is not logically connected via a wired link 306 to the Wi-Fi router 307, since it operates as a backhaul for the local 3GPP devices 312 at the premises via the cellular base stations 327 (e.g., 3GPP xNBs) it communicates with. In one variant, the CPE-to-user device (e.g., CPE-to-UE) wireless link utilizes the same licensed spectrum as the link between the 3GPP xNB and the CPE (repeater). In another variant, different spectrum is used for the two links. As previously noted, the present disclosure further contemplates combinations of licensed, quasi-licensed, and unlicensed spectrum use for the various links, depending on the particular application and air interface protocols used.

The cellular base station 327 (eNB/gNB) is operated by a Mobile Network Operator network and is connected to an MNO core 323. The CPE 305 in one embodiment contains one or more SIM (subscriber identity modules) e.g., associated with one or more wireless service operators. As such, the CPE/FWA 305, when operating in the cellular repeater mode, acts in effect as a UE (e.g., has an IMEI), and is treated as such by the mobile network with which it connects. In one embodiment discussed in greater detail below, after selecting a suitable base station to use as backhaul based on e.g., best signal strength or RSRP, the CPE 305 will attempt to register to the MNO network based on appropriate SIM credentials (in one embodiment, according to the standard 3GPP registration protocol via the RACH), and is authenticated with the provider, wherein RRC Connected State is ultimately attained, and data communication between the CPE/FWA and the serving xNB occurs. The CPE 305 is also registered to the MNO Core 323, and as discussed in greater detail below, may be assigned dedicated or semi-dedicated resources or capacity of the serving xNB.

In other embodiments, the CPE/FWA 305 is configured to proceed directly to connection to a known network (e.g., one associated with a SIM it possesses which correlates to the known network), including the foregoing authentication. After the authentication by, and registration with the provider is successful, the CPE 305 measures all the available base station/sector signals available to it via the FWA antenna elements (e.g., roof-mounted or pole-mounted apparatus of the premises), and selects the sector and/or base station with highest Referenced Signal Received Power (RSRP) to connect with. After the CPE 305 selects and establishes a connection with the "best" base station available, it registers with the MNO network core 323 (indicating that it is now operative as a backhaul/extender), and starts transacting data between its served UEs 312 and the base station 327.

In one embodiment, the connected CPE/FWA 305 is treated by the serving xNB (and core 323) as merely another UE, and hence is given no specific privilege or allocation of resources. This approach has the advantage of obviating any particular modifications or accommodations within the MNO infrastructure to enable its xNBs to serve as backhaul for MSO CPE/repeaters.

However, in other approaches, the MNO and MSO may cooperate, or the MNO core may be otherwise configured such that MSO CPE 305 acting as extenders are provided a separate status or treatment. For instance, in one such implementation, the CPE 305 signals to the connected xNB 327 (such as via existing or added protocol messages) that it is operating as an MSO extender; this data is passed to the MNO core 323 and utilized thereby to signal the connected xNB 327 to implement one or more extender-specific schemes of operation. For instance, one such scheme might be simply to reserve a prescribed amount of capacity or bandwidth for the CPE 305 (based on the assumption that the CPE, acting as an extender and backhaul for the premises which has presumably lost its primary backhaul, will consume a prescribed amount of bandwidth). In other schemes, the CPE 305 may be given a different priority with respect to resources or other functions as compared to other non-CPE UEs (e.g., mobile users unassociated with the premises).

It will be appreciated that the present disclosure contemplates multiple different mobile device (e.g., UE) configurations for accessing the various networks with which it may communicate. For instance, in one such scenario, the UE utilizes credentials (e.g., via an installed SIM card, SE (Secure Element), or other such approach) associated with the host MNO with which the UE is ultimately connecting; i.e., the CPE acts as a pass-through for authentication data negotiated between the UE (SIM or SE) and the MNO network authentication functions, as forwarded by the CPE (and MNO xNB to which it connects as a repeater). Access to the pass-through or repeater function of the CPE may be unauthenticated or "open" in nature (e.g., any valid MNO subscriber may use the CPE as a repeater regardless of whether they are an MSO subscriber or not), or alternatively the UE or its user may be required to authenticate to the MSO network before it can access the xNB repeater functionality (such as by either a separate SIM/SE; e.g., dual-SIM configuration, or alternatively the user registering the MNO SIM/SE with the MSO, such that the MSO network can use the MNO SIM/SE data from the UE to cross-reference an MSO database of valid MSO subscribers with registered MNO UE). Yet other mechanisms for authenticating the UE/user to the MSO network prior to CPE repeater function access may also be used (i.e., non-SIM/SE based approaches), such as username/password prompt and entry, MAC data of the specific UE registered with the MSO, or other).

Alternatively, the UE may utilize an MSO-specific SIM/SE to authenticate to the CPE (acting as the xNB repeater), and the CPE maintains separate credentials to authenticate itself to the MNO network. For instance, the MNO and MSO may have a cooperative arrangement wherein the MSO's CPE each or collectively have a "subscription" to the MNO network, such that a CPE failing over from normal operation to the xNB/cellular repeater mode of operation appears to the xNB to which it can connect as merely another UE of sorts, albeit passing the UE's user plane signals to the xNB.

Figure 4C:
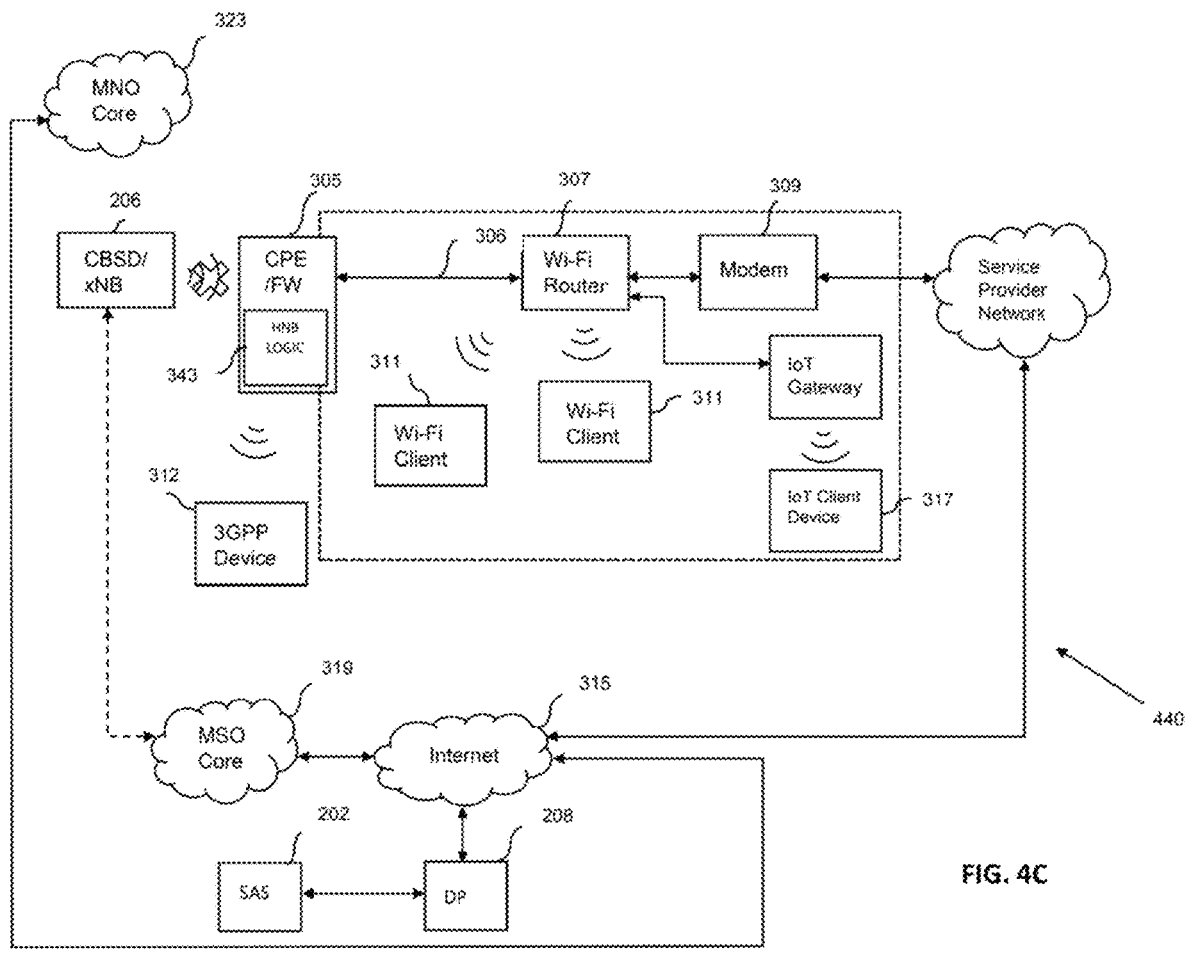
FIG. 4C is a block diagram illustrating a fourth exemplary embodiment of a multi-mode CPE configured as a 3GPP (e.g., LTE) femtocell or HNB according to the present disclosure.

FIG. 4C is a block diagram illustrating a fourth exemplary embodiment of a multi-mode CPE configured as a 3GPP (e.g., LTE) femtocell or HNB according to the present disclosure. As shown, the CPE/FWA 305 in this architecture 440 acts as a femtocell or "home node B" (HNB) when for example its primary backhaul is lost. As such, the CPE 305 can provide 3GPP connectivity and backhaul to the local devices 312 (e.g., UEs) via the secondary backhaul/modem 309 of the premises, out to the Internet or other internetwork, and ultimately to the MNO core. HNB logic 343 on the CPE is utilized to effect HNB-type operation of the CPE with the served UE 312. Here, the CPE 305 acts completely as a pass-through entity, since the UE SIM is utilized to communicate with the MNO core 323 for authentication, registration, and other functions. As with the WLAN extender mode described above (FIG. 4A), the router 307 may also be configured to, upon signaling from the CPE 305 or other mechanism, reserve capacity or other resources for the CPE 305 when in femtocell mode, such that the CPE (femtocell) is not starved of bandwidth or subject to excessive latency when the router is serving WLAN clients 311 and the femtocell is operative for 3GPP UE clients 312.

Figure 4D:
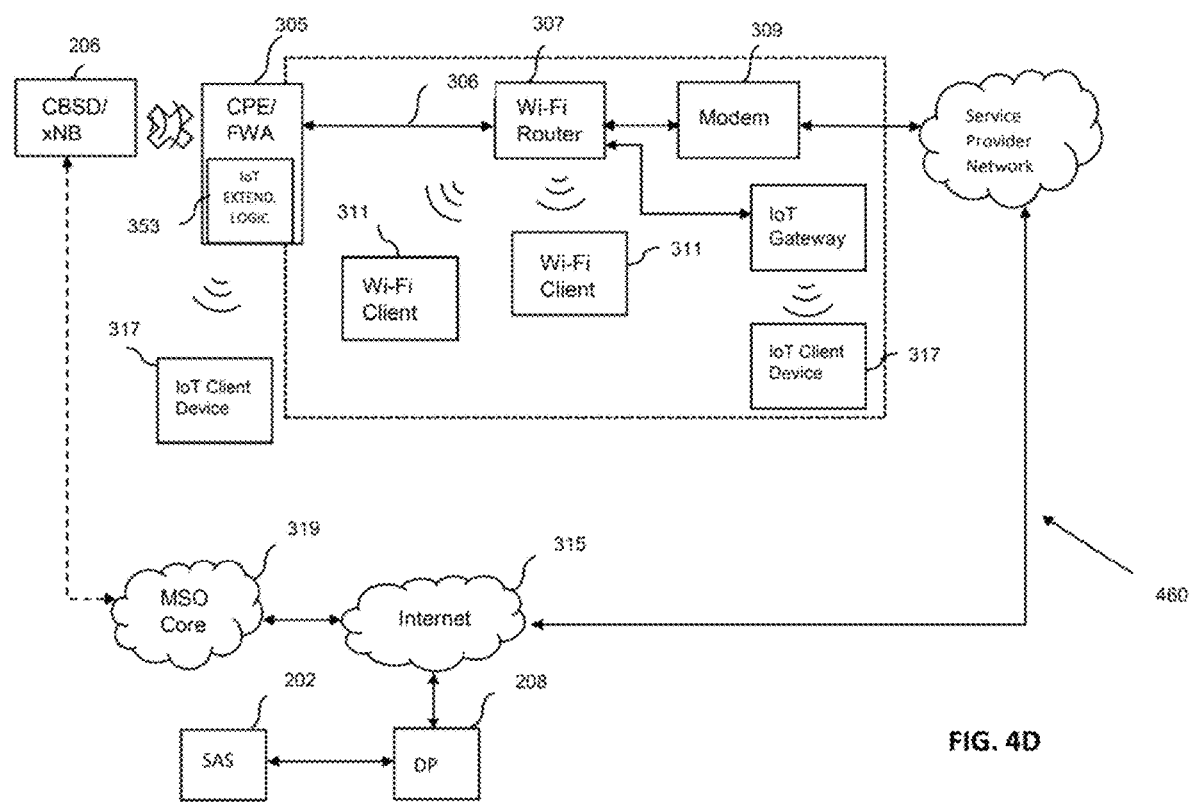
FIG. 4D is a block diagram illustrating a fifth exemplary embodiment of a multi-mode CPE configured as a premises IoT (Internet of Things) extender, according to the present disclosure.

FIG. 4D is a block diagram illustrating a fifth exemplary embodiment of a multi-mode CPE configured as a premises IoT (Internet of Things) extender, according to the present disclosure. As shown, the architecture 460 of FIG. 4D operates in generally similar fashion to that of FIG. 4A (WLAN), with the exception that the underlying air interface(s) are different (e.g., PAN versus LAN), and may include for example Bluetooth/BLE, IEEE Std. 802.15.4, LoRaWAN, or other (including multiple ones of the foregoing or others, if compatible to operate contemporaneously). The CPE uses IoT extension logic 353 to control operation of the one or more IoT interfaces for communication with one or more IoT client devices 317, including trading off of interfaces depending on the IoT functionality desired at any given time. Depending on configuration and desired applications, the CPE 305 may also subsume the IoT gateway function internally as well (i.e., operate as an IoT gateway and include IoT air interfaces). One salient advantage of using the CPE/FWA 305 as an IoT extender is coverage area; since the FWA antenna is e.g., roof- or pole-mounted, it provides significant enhancement in coverage and range over a typical IoT gateway or interface, including to distant outdoor applications such as industrial or agricultural sensors. As such, the present disclosure is compatible with such implementations as described in co-owned U.S. patent application Ser. No. 16/675,098 filed Nov. 5, 2019 entitled "WIRELESS ENABLED DISTRIBUTED DATA APPARATUS AND METHODS", and issued as U.S. Pat. No. 11,374,779 on Jun. 28, 2022, incorporated herein by reference in its entirety.

Methods—

Referring now to FIG. 5, one embodiment of the general methodology 500 of using a multi-mode CPE/FWA according to the present disclosure is shown and described. It will be appreciated that while described in the exemplary context of a CBRS-based system with SAS 202, CBSD/xNBs 206, database 211, DP 208 and CPE 305, as previously described, the methodology 500 is in no way so limited.

At step 503 of the method 500, a CPE/FWA 305 attempts connection to a serving CBSD 206. Depending on whether the CBSD is assigned a frequency or not (or has an impending loss of spectrum grant), per step 505, the CPE will proceed to steps 507, 509, or 511, as described below. A number of scenarios may exist for the CPE/CBSD. For instance, in one scenario, the CPE attempts to connect to the CBSD, and the connection to the CBSD is established, and the CPE/CBSD operate to provide normal backhaul functionality per step 511.

In another scenario, the connection attempt fails due to, e.g., the CBSD not having a then-valid spectrum grant from the SAS, or the CBSD is aware of an incipient withdrawal of a grant currently being used (and rejects the CPE connection request so as to avoid a connection/immediate disconnection scenario).

Alternatively, the CPE and CBSD may already be connected, but the spectrum utilized is withdrawn (due to e.g., interference considerations, incumbent usage, or other) and no substitute or replacement grant is imminent.

Hence, per step 505, when no connection can be established/maintained per steps 503, 505, the CPE/FWA 305 implements decision logic at step 506, the logic configured to determine one of a plurality of alternate modes under which the CPE/FWA may be utilized (e.g., FIGS. 4A-4D supra). As shown, the CPE/FWA may enter one or more modes (depending on configuration and capabilities of the device) including: 1) as a WLAN/PAN extender (step 509); 2) as a cellular repeater or extender (step 507), and/or 3) as a femtocell/HNB (step 513).

Figure 9:
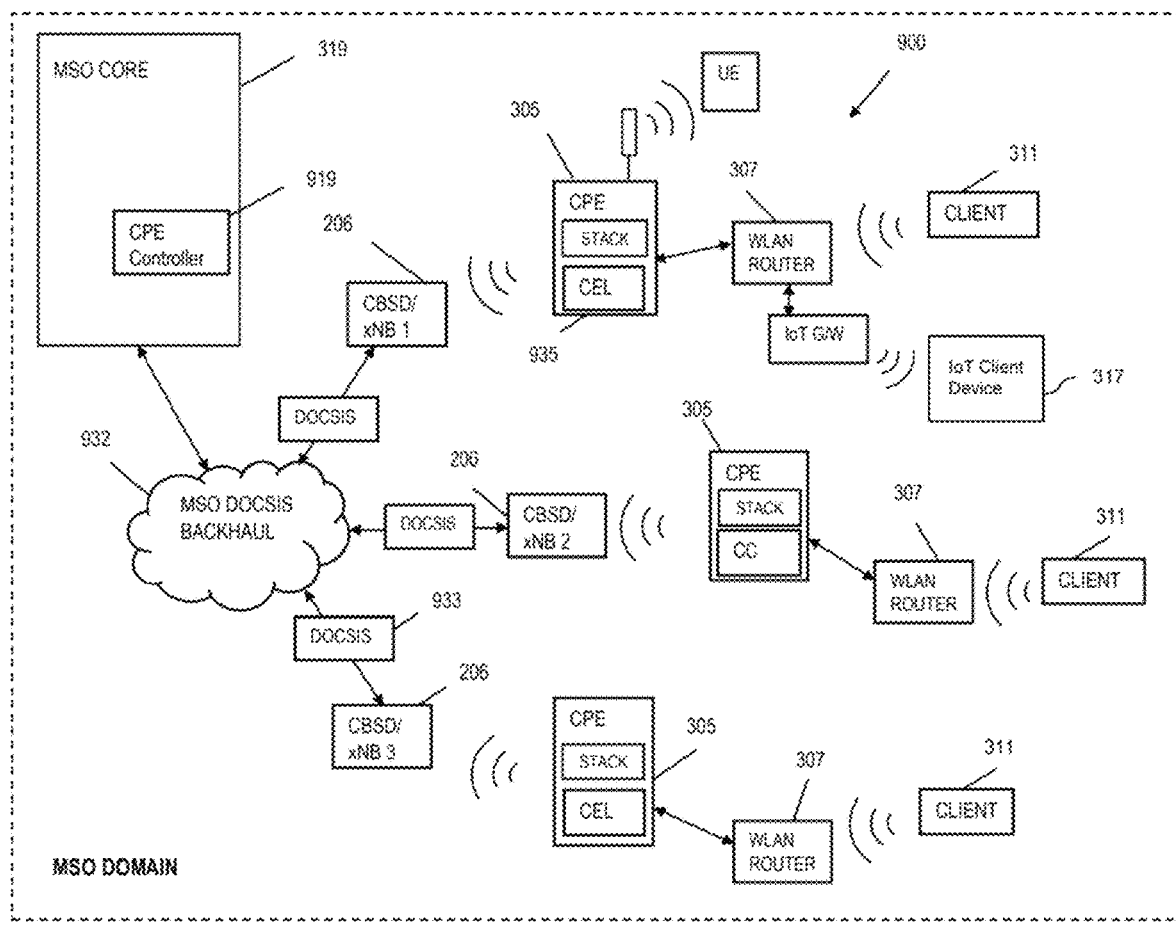
FIG. 9 is a functional block diagram of a first exemplary MSO network architecture useful in conjunction with various principles described herein.
Figure 10:
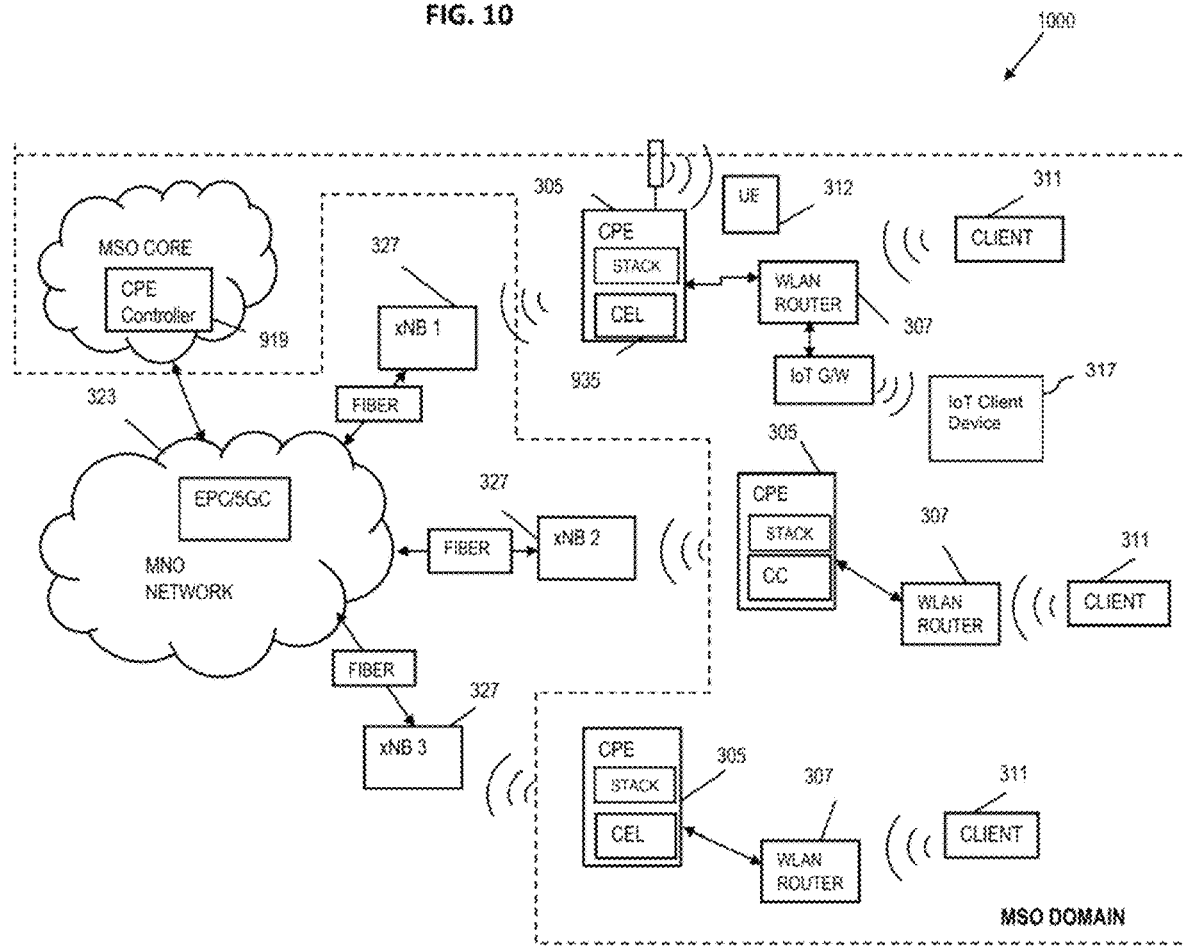
FIG. 10 is a functional block diagram of an exemplary MNO network architecture useful in conjunction with various principles described herein, wherein respective portions of the infrastructure are managed or operated by the MSO and one or more MNOs.

In one variant, the decision logic is "hard coded" into the firmware of the CPE/FWA 305 by the MSO prior to or at installation, and the CPE/FWA operates autonomously using such logic (and input data it receives, such as relating to loss of the primary backhaul connection, presence of a WLAN router 307 and/or IoT gateway function within the premises and connected thereto, BLE device inquiries received, 3GPP UE RACH or similar attempts, or yet other data) to decide which mode to utilize at any given point in time. In another configuration (see discussion of FIGS. 9 and 10 presented subsequently herein), the CPE/FWA decision logic 506 is at least partly controlled or configured by a network-based controller process, such as one maintained by the MSO. Upon incipient loss of the primary backhaul, the controller process may signal the CPE/FWA at the premises to implement one or more logical constructs, depending on data the network process may obtain from the premises, and/or data from other sources such as operating MNOs in the area, presence of IoT sensors at the premises being monitored by a third party (e.g., utility or agricultural concern monitoring the IoT sensors), etc.

Even after the primary backhaul is compromised, such MSO network process can communicate with the CPE via the secondary backhaul/service provider network (see FIG. 3), such as via the modem 309. For instance, in one variant, the CPE/FWA 305 is configured to first "fail over" to the WLAN router extender mode or other mode whereby the CPE/FWA can receive messaging from the network process via the service provider network/modem. Based on such data, the CPE/FWA can then assume a role or mode as directed by the network, or implement yet other logic as directed.

It will be appreciated that the present disclosure also contemplates dynamic utilization of one or more modes of the CPE/FWA 305. Specifically, the decision logic 506 may be configured to enable the CPE//FWA to 1) assume two or more modes simultaneously, wherein the two or modes are compatible and can be supported by the CPE/FWA and supporting infrastructure, or 2) switch between two or modes based on changing conditions or demand. For example 33, simultaneous operation of the CPE/FWA as a WLAN extender (e.g., in a 5 GHz mode) as well as a BLE or Zigbee or LoRaWAN extender (2.4 GHz, 900 MHz, etc.) may be supported, as may say tandem operation of the CPE/FWA as a 3GPP femtocell and as a BLE extender. To the degree that all BLE or 3GPP or WLAN demand drops off at the premises, the CPE/FWA may dynamically change modes as needed to support extant requests for service. Likewise, the CPE/FWA decision logic 506 may be configured to implement certain prescribed schedules and/or priorities/tiers of service, such as where IoT extender mode is only utilized late-night (when no other uses are anticipated) to support e.g., distributed IoT sensor support or long-range, low-bandwidth communication such as via LoRaWAN).

Figure 5A:
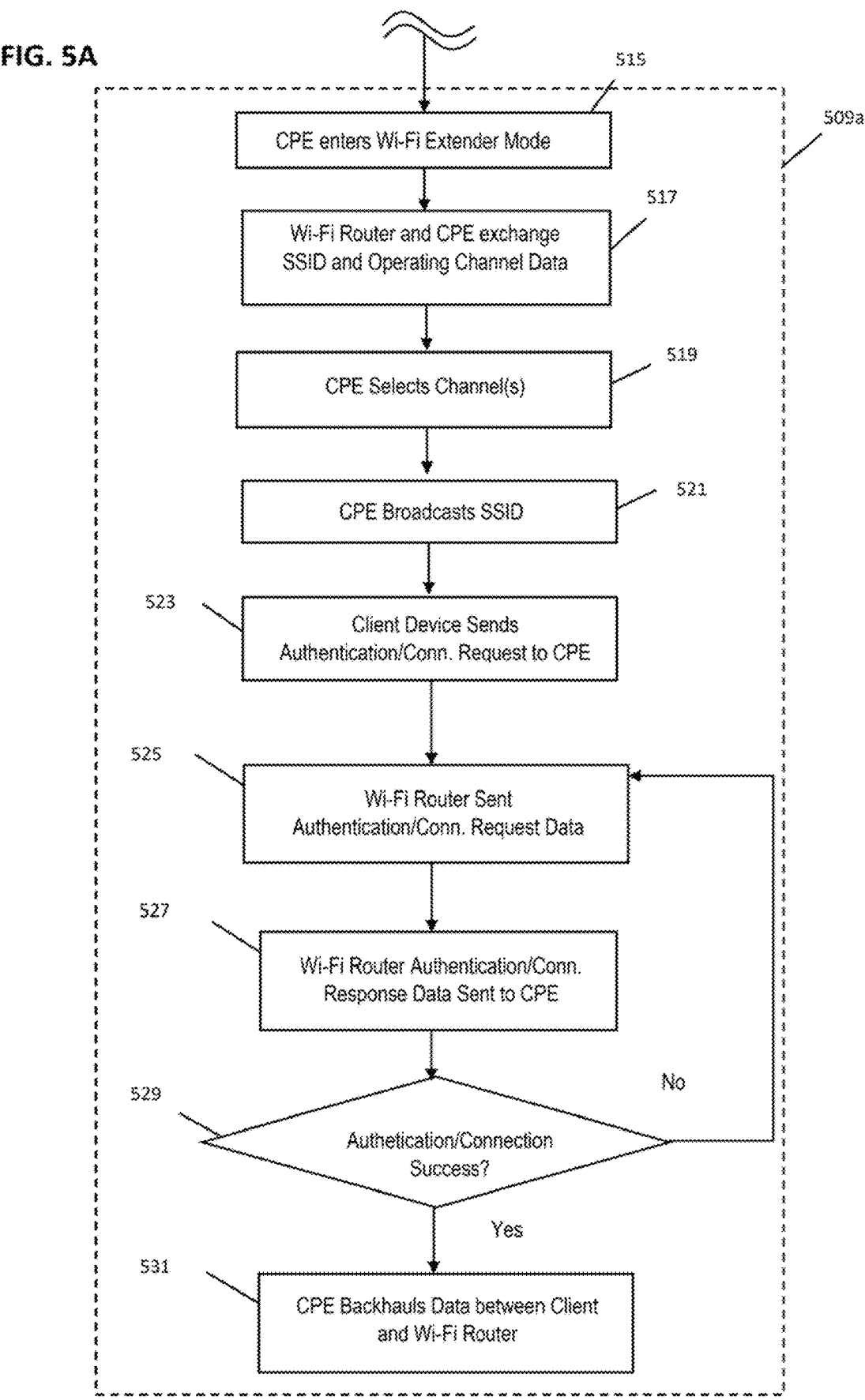
FIG. 5A is a logical flow diagram of an exemplary implementation of the generalized method of FIG. 5, specifically for using a multi-mode CPE as a Wi-Fi extender.

Referring to FIG. 5A, one implementation of the method 500 for using a multi-mode CPE (here as a Wi-Fi extender device as in step 509) is shown and described.

At step 515 of the method 509*a*, the CPE/FWA enters Wi-Fi extender mode (e.g., via the decision logic 506). The CPE signals the router 307 (FIG. 4A) of this mode change.

Per step 517, the Wi-Fi router exchanges operating data (e.g., its SSID and the operating channels used) with the CPE/FWA 305.

Next, per step 519, the CPE selects either the same or a different channel(s) than the Wi-Fi router 307. Such selection may be made based on data provided by the router (e.g., a directive to utilize the same or different RF carriers, or by internal extender mode logic of the CPE/FWA itself (see FIGS. 7 and 8).

Next, per step 521, the CPE 305 starts transmitting the same SSID as the Wi-Fi router on the selected channel(s) so as to advertise itself to WLAN clients 311.

Next, per step 523, the CPE receives authentication and connection requests from one or more Wi-Fi client devices per IEEE Std. 802.11 protocols.

Next per step 525, the Wi-Fi router is sent the authentication and connection requests (in the proper order) by the CPE. Note that in other configurations, the CPE may be configured to authenticate and connect the requesting WLAN clients 311 itself locally, and merely use the router functions of the router (versus WLAN MAC functionality) to access the modem 309 and backhaul. Various other configurations will be recognized by those of ordinary skill given the present disclosure.

At step 527, the router 307 responds to the authentication and connection requests, and if successful per step 529, connects the WLAN clients 311 logically to the router 307 for WLAN data backhaul service (with the air interface/PHY functions provided by the CPE/FWA operating as extender).

Figure 5B:
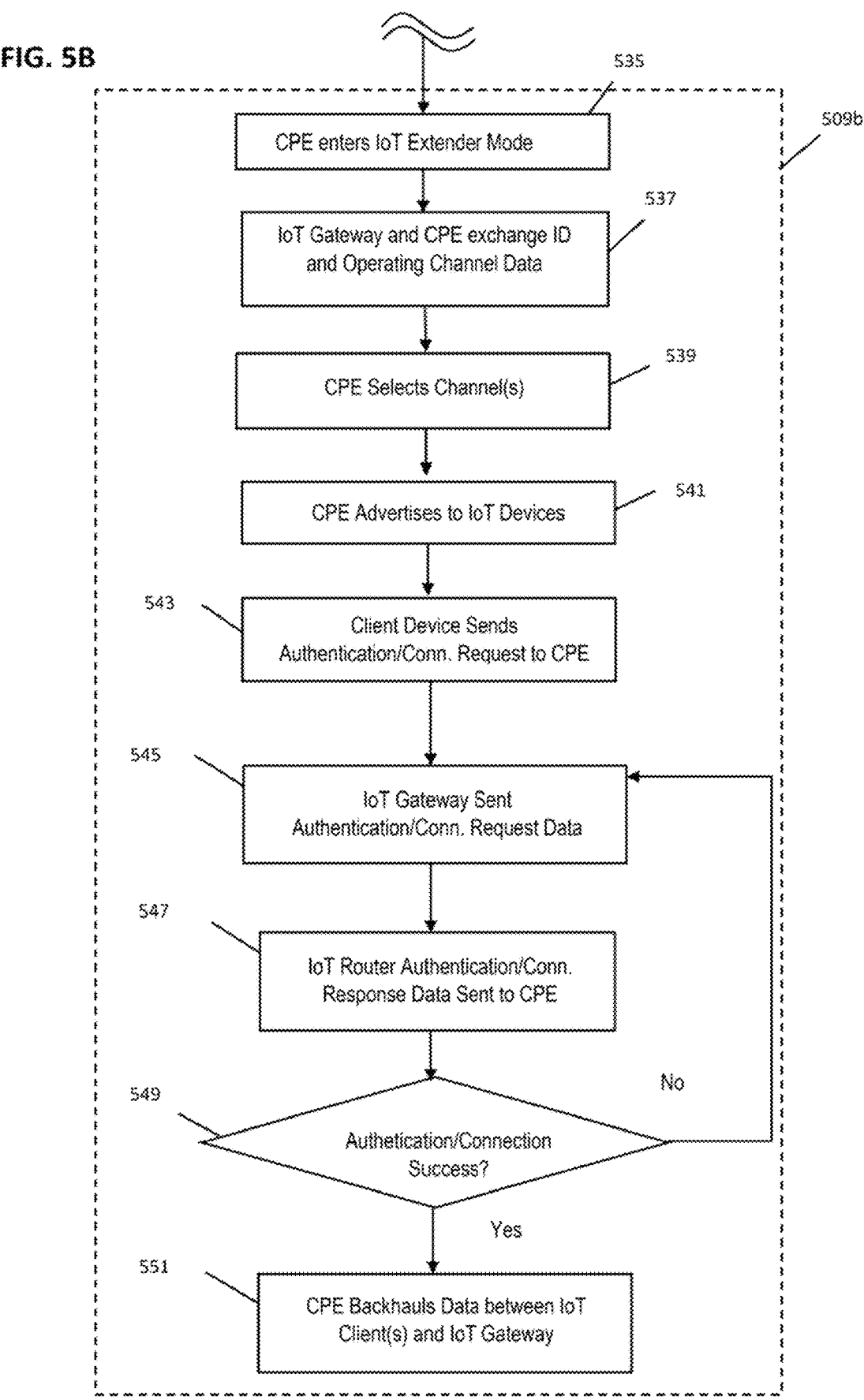
FIG. 5B is a logical flow diagram of an exemplary implementation of the generalized method of FIG. 5, specifically for using a multi-mode CPE as an IoT extender.

Referring to FIG. 5B, one implementation of the method 500 for using a multi-mode CPE (here as an IoT extender device as in step 509) is shown and described.

At step 535 of the method 509*b* of FIG. 5B, the CPE/FWA enters IoT extender mode (e.g., via the decision logic 506). The CPE signals the router 307 (FIG. 4D) of this mode change, which passes the signaling to the IoT gateway function 313.

Per step 537, the IoT gateway function 313, via the Wi-Fi router, exchanges operating data (e.g., its identifier data and the operating protocols/channels used) with the CPE/FWA 305. In that the gateway function may utilize two or more different IoT air interfaces (e.g., BLE, Zigbee/802.15.4, etc.), the gateway function may identify such protocol(s) in use to the CPE/FWA, such that the CPE/FWA can in effect mimic the configuration of the gateway function. Alternatively, the CPE/FWA may assume another configuration, even including one wholly different or heterogeneous with that being used by the gateway function 313. For example, outdoor longer-range LoRaWAN-based sensors (e.g., for industrial or agricultural applications) may only be useful in conjunction with the CPE extender 305, whereas the indoor IoT gateway 313 may only utilize shorter-range PAN protocols such as Zigbee or BLE.

Next, per step 539, the CPE selects either the same or a different channel(s) than the IoT gateway 313. Such selection may be made based on data provided by the gateway (e.g., a directive to utilize the same or different RF carriers, or by internal extender mode logic of the CPE/FWA itself (see FIGS. 7 and 8).

Next, per step 541, the CPE 305 starts advertisement on the selected channel(s) so as to advertise itself to IoT clients 317. Depending on protocol, this "advertisement" may be a CPE-initiated protocol, a client-initiated protocol, or yet other approach (see, e.g., the exemplary BLE-based protocol of FIG. 6B)

Next, per step 543, the CPE receives authentication and connection requests from one or more IoT client devices per the selected IoT air interface protocols.

Next per step 545, the gateway 313 (via the Wi-Fi router) is sent the authentication and connection requests (in the proper order) by the CPE. Note that in other configurations, the CPE may be configured to authenticate and connect the requesting IoT clients 317 itself locally, and merely use the router functions of the router (versus any IoT gateway MAC or other functionality) to access the modem 309 and backhaul. Various other configurations will be recognized by those of ordinary skill given the present disclosure.

At step 547, the gateway 313 responds to the authentication and connection requests, and if successful per step 549, connects the IoT clients 317 logically to the router 307 for IoT data backhaul service (with the air interface/PHY functions provided by the CPE/FWA operating as extender). The IoT gateway 313 may also consume the transacted IoT client data from the CPE 305 locally, such as where two premises IoT devices communicate (e.g., client 317 to gateway 313, or outdoor client 317 to another e.g., indoor client 317).

Figure 5C:
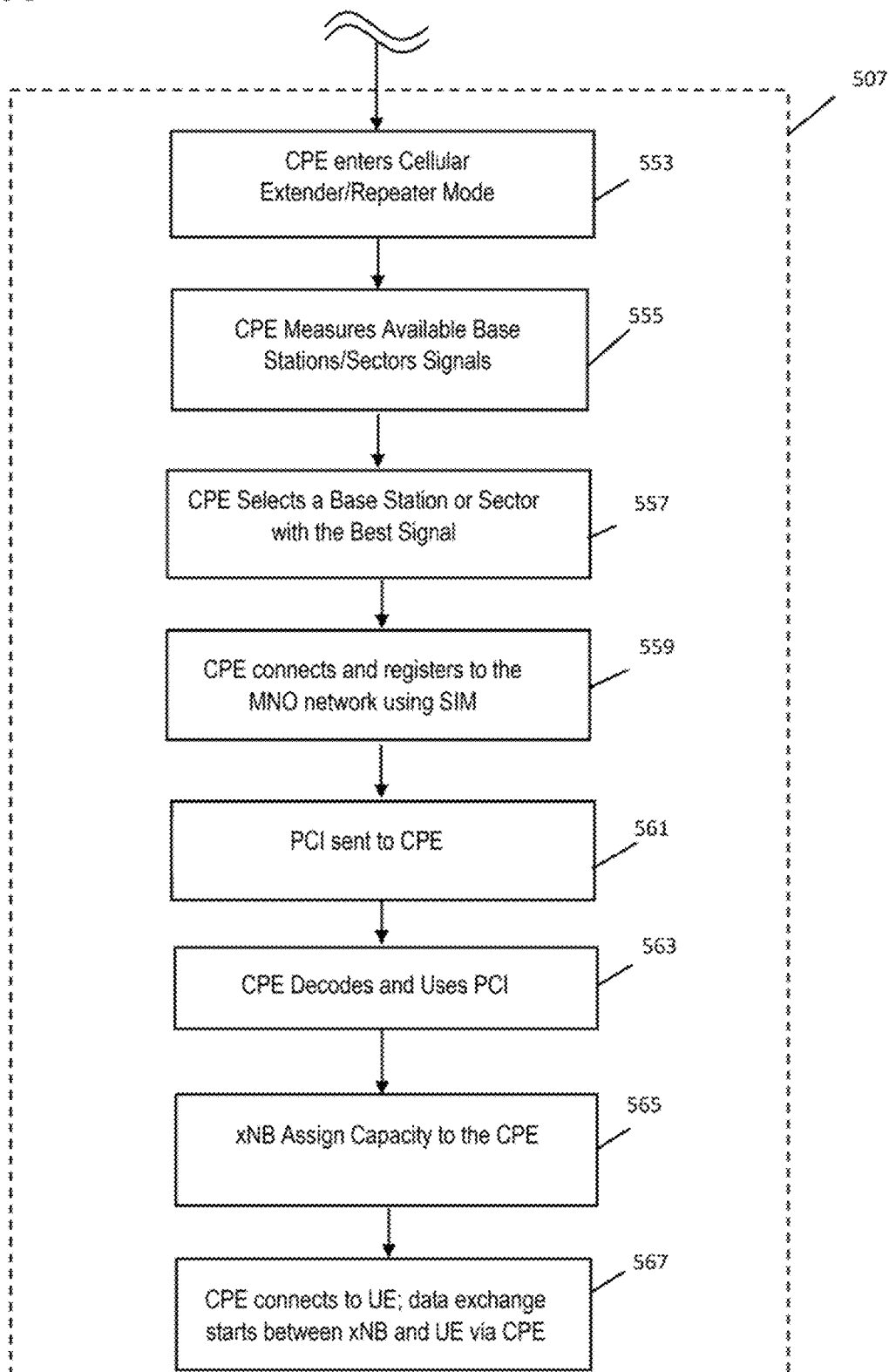
FIG. 5C is a logical flow diagram of an exemplary implementation of the generalized method of FIG. 5, specifically for using a multi-mode CPE as a cellular base station (e.g., xNB) extender.

Referring to FIG. 5C, one implementation of the method 500 for using a multi-mode CPE (here as a cellular base station repeater or extender device as in step 507 of FIG. 5) is shown and described.

Per step 553, the CPE enters cellular (e.g., 3GPP compatible) signal repeater mode.

Next, per step 555, the CPE measures RF signal for all the available base stations/sectors accessible to it. As previously referenced, various implementations are possible here. For example, in one configuration, the CPE/FWA 305 may have a priori knowledge of one or more extant cellular base stations (xNBs) associated with a given MNO, such as via prior connection therewith. The CPE/FWA may also only have SIM data (e.g., an IMEI) for one MNO. As such, the CPE/FWA logic may be configured under one paradigm to attempt authentication and connection with that (known) MNO using that SIM data, and thereafter utilize signals received from the connected xNB(s) to further refine which of the xNBs (and or antenna sectors or spatial diversity channels of its MIMO array if so equipped) it will ultimately use for connection and establishment of the extender/backhaul functionality.

In an alternative paradigm, the CPE/FWA can be equipped with multiple SIM devices/data, and in effect run through a logic tree to decide which service provider/MNO to utilize, including based on considerations such as available signal strength/bandwidth, cost per minute or per Gb or data transacted, incentives in place (such as electronic discounts or "coupons" available to the customer by virtue of pre-existing agreements between the customer's MSO and a given MNO), or other. In some such instance, the CPE/FWA 305 may have stored data indicative of prior connections with each MNO (similar to the paradigm described above), such that it in effect knows which MNOs it can viably connect with given its current geographic location, topology, xNB placements, etc.

However, the present disclosure also contemplates a paradigm wherein the existence or connectivity to a given MNO is indeterminate (such as for example at initial install, where the non-volatile memory of the CPE/FWA has been corrupted, or other), such that the CPE/FWA is effectively ignorant of connection possibilities. As such, the CPE extender logic may be configured to perform "blind" scans of one or more radio frequency bands and/or sectors of its antenna array and, using an energy correlation function (e.g., one based on Zadoff-Chu CAZAC or similar logic), obtain data regarding energy density within certain time/frequency/ azimuth resource coordinates, and attempt to effect subsequent connection based thereon (e.g., by attempting 3GPP RACH procedures) using one or more of the SIM data.

Returning to FIG. 5C, per step 557, the CPE selects a base station/sector with the highest RSRP, and connects to the MNO per step 559, using a standard RACH procedure, is authenticated, and registers to the MNO.

Next, per step 561, the connected base station 327 sends a Physical Cell Identity (PCI) to the CPE; this enables the CPE/FWA to in effect mimic itself as the connected xNB. The CPE decodes the PCI at step 563, and uses the identity for subsequent transactions with the UE 312 (e.g., the latter utilizing a standard 3GPP cell search procedure).

Next, per step 565, the base station 327 may assign air interface (e.g., time-frequency or other) resources to the CPE/FWA, whether of its own volition or based on directive/ signaling from the MNO core 323, such as based on registration of the CPE/FWA as a repeater as described elsewhere herein (thereby affording it some differentiated status as compared to any normal UE).

Lastly, per step 567, data is transacted between the base station 327 and the CPE/FWA 305, such as based on UE 312 connection with the CPE 305, or Wi-Fi router (cable) connection to the CPE.

FIG. 5D is a logical flow diagram of the exemplary embodiment of a general method for operating an extender-enabled WLAN router or AP according to the present disclosure. As shown, the method 550 includes transition from a normal state of router operation (i.e., with the CPE/FWA 305 physically connected, but not utilizing the router for e.g., backhaul functions) per step 553 to an abnormal or "extender" mode of operation per step 555 (e.g., one necessitated by the CPE's loss of its primary backhaul with its serving CBSD 206).

Next, per step 557, the router logic (see FIG. 8) determines whether the router 307 and its associated modem 309 and backhaul have sufficient capacity to support the CPE extender functionality. This determination may be accomplished using any number of approaches, including for example (i) using data generated by operative iPerf processes or clients running on the router or connected device(s) to determine a relationship of average/peak bandwidth consumption via the backhaul as compared to its maximum prescribed capacity, (ii) based on historical or predictive data regarding premises WLAN and/or IoT usage; (iii) based on affirmative user query/input (e.g., as to prioritization of applications or devices then operative and consuming bandwidth via the secondary backhaul), whether previously input by the user or contemporaneous with the extender request; and/or (iv) based on data indicating that the secondary backhaul or its modem 309 are inoperative or in deduced capacity. It will also be noted that in certain embodiments, the extender report or request from the CPE/ FWA 305 may include data indicative of or characterizing the type and/or magnitude of service required, including known or estimated UL/DL asymmetries, estimated Mbps for each link, type of service (e.g., continuous, episodic, etc.). This data may be generated for example by the CPE/FWA logic (see FIG. 7), or even by a requesting client device to be serviced by the extender (e.g., an end-user device app which is capable of estimation of its bandwidth or other performance requirements such as QoS or latency.

Then, depending on the router logic analysis per step 557, the request is either rejected (step 559) or admitted, the latter including allocation or reservation of backhaul bandwidth per step 561 (such as packet flow control mechanisms, assignment of certain QoS classification to the extender data, or other), and subsequent servicing of the extender clients per step 563.

It will also be appreciated that while the methods of FIGS. 5-5D illustrate utilization of a CPE in different operational modes, such methods may also be adapted to implement alternate logic, such as where for example the CPE itself determines as a threshold or gating criterion whether such alternate modes are even required. For example, if there are other CBSD/xNB 206 in the area in close proximity to the CPE/FWA, the CPE/FWA may attempt to establish communication with a serving neighbor CBSD (including according to a prescribed hierarchy or protocol, or under direction of a network CBRS controller), such other CBSD which is currently assigned a valid frequency (and hence ostensibly available for backhaul). If unsuccessful, then the logic may cause the CPE/FWA 305 to fail over to the alternate CPE modes described herein. Similarly, the FWA/CPE logic may be configured to utilize data regarding known CBSD placements or locations to "beam steer" its MIMO array (if included) towards each of the known CBSD locations successively in order to ostensibly obtain better signal utilization/path loss with respect to the various CBSDs to attempt a registration with its associated CBSD. For example, a given CPE/FWA may not know a priori whether its inability to connect to its preferred CBSD is due to a spectrum withdrawal, interference, equipment failure, obstruction such as new structure, damage or misalignment of the FWA roof/pole antennae, etc., and hence it can be programmed to assume that the CBSD is operational, and that the failure to connect may be correctable via (i) retry of the connection protocol; (ii) if failing (i), then "intelligent" azimuth and/or elevation beam steering about the last known coordinates in an attempt to recover sufficient signal strength for a connection.

Figure 6A:
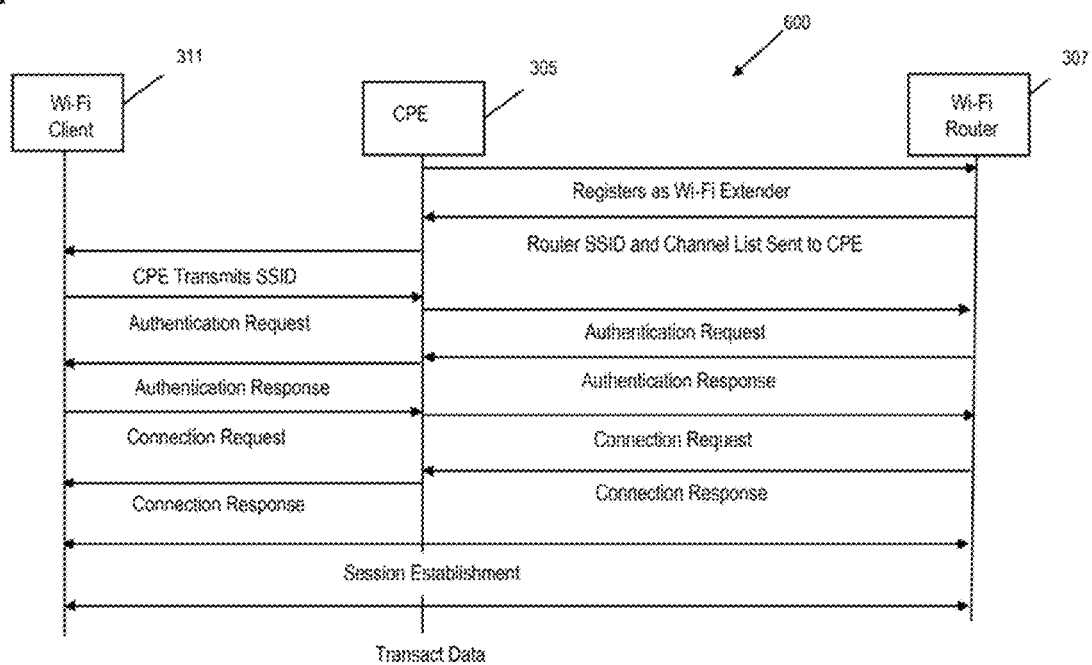
FIG. 6A is a ladder diagram illustrating one embodiment of a multi-mode CPE registration, authentication and connection protocol for using the CPE as a Wi-Fi extender in pass-through mode, according to the disclosure.

FIG. 6A is a ladder diagram illustrating an exemplary initial registration protocol 600 for the multi-mode CPE in Wi-Fi extender mode in accordance with the architecture of FIG. 4A (CPE acting as layer 2/3 pass-through).

Figure 6B:
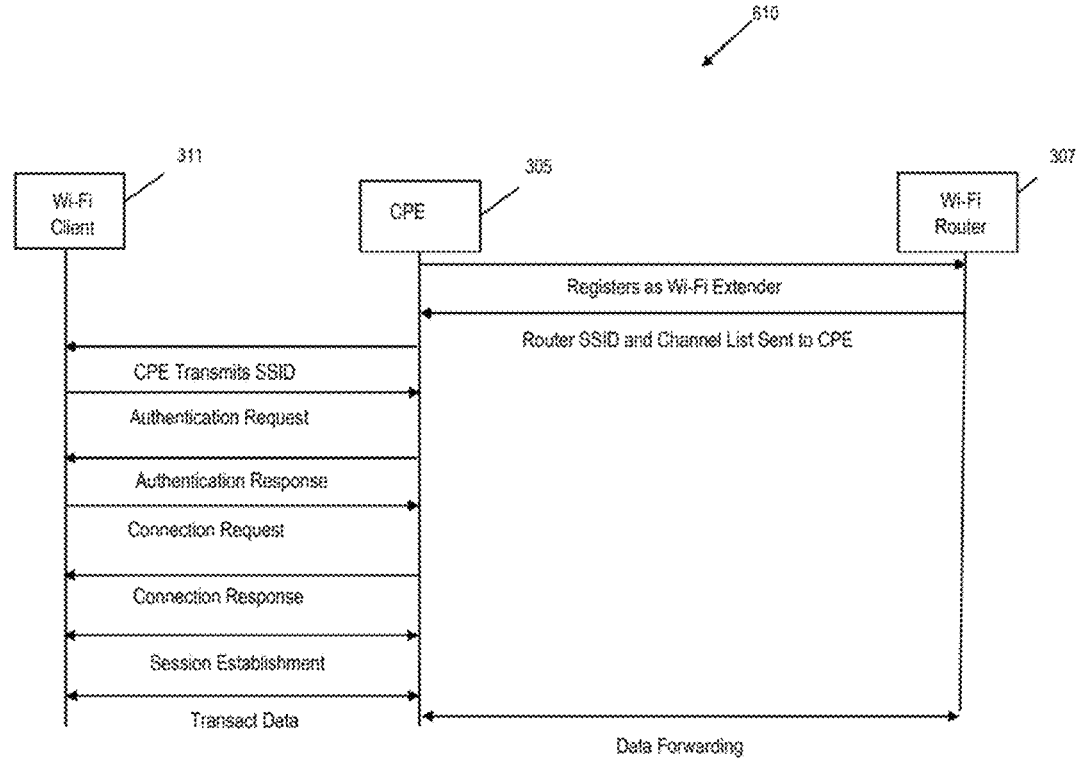
FIG. 6B is a ladder diagram illustrating one embodiment of a multi-mode CPE registration, authentication and connection protocol for using the CPE as a Wi-Fi extender and WLAN AP, according to the disclosure.

FIG. 6B is a ladder diagram illustrating an exemplary initial registration protocol 610 for the multi-mode CPE in Wi-Fi extender mode in accordance with the architecture of FIG. 4A (CPE acting as an 802.11A AP with layer 2/3 functions).

Figure 6C:
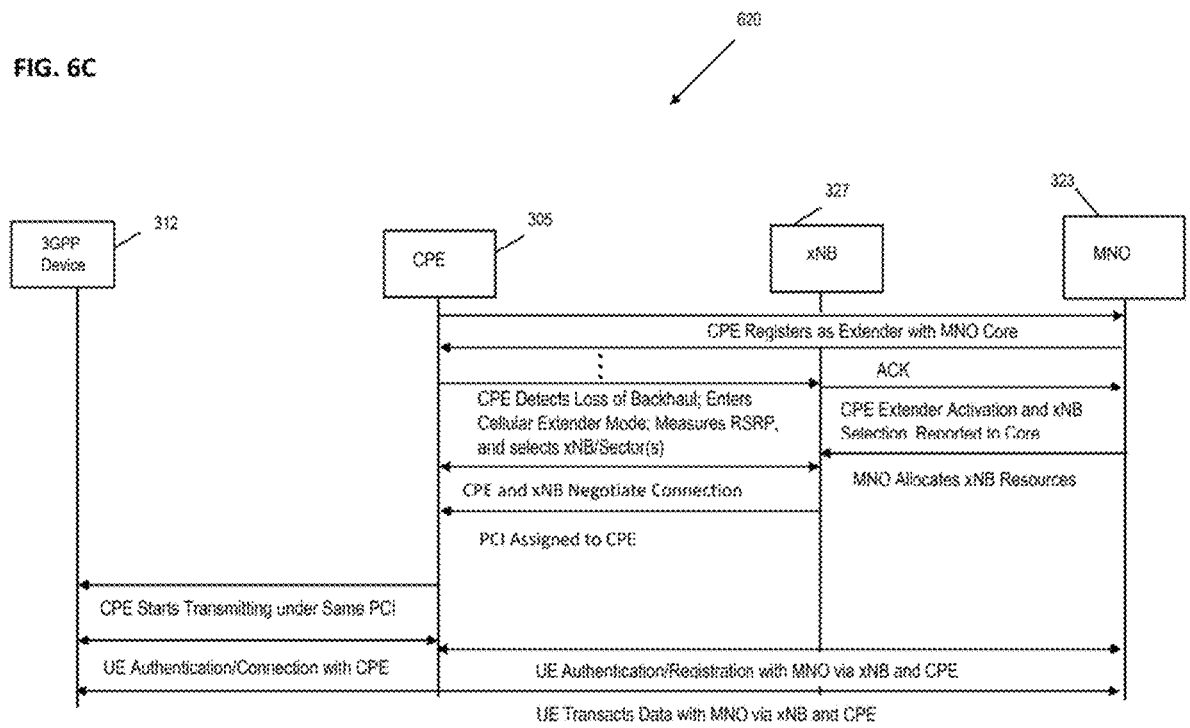
FIG. 6C is a ladder diagram illustrating one embodiment of a multi-mode CPE registration, authentication and connection protocol for using the CPE as a cellular (e.g., 3GPP xNB) extender, according to the disclosure.

FIG. 6C is a ladder diagram illustrating an exemplary initial registration protocol 620 for the multi-mode CPE in 3GPP xNB extender mode in accordance with the architecture of FIG. 4B.

Figure 6D:
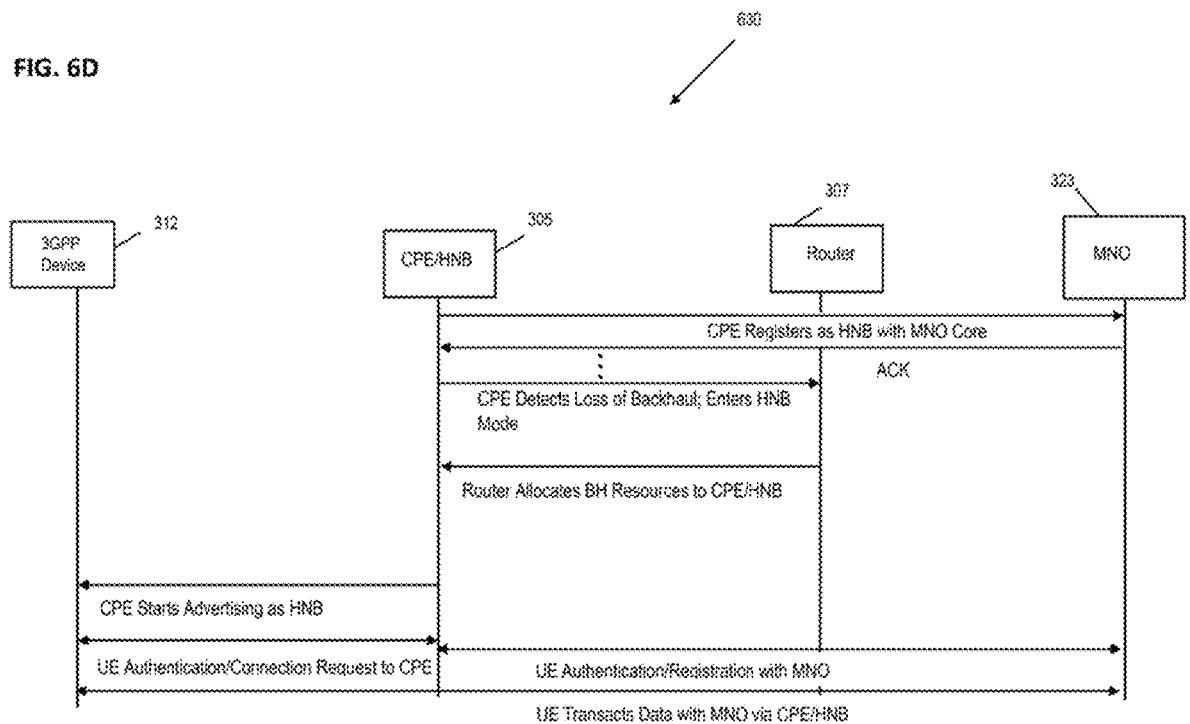
FIG. 6D is a ladder diagram illustrating one embodiment of a multi-mode CPE registration, authentication and connection protocol for using the CPE as a femtocell (e.g., HNB), according to the disclosure.

FIG. 6D is a ladder diagram illustrating an exemplary initial registration protocol 630 for the multi-mode CPE in HNB mode in accordance with the architecture of FIG. 4C.

Figure 6E:
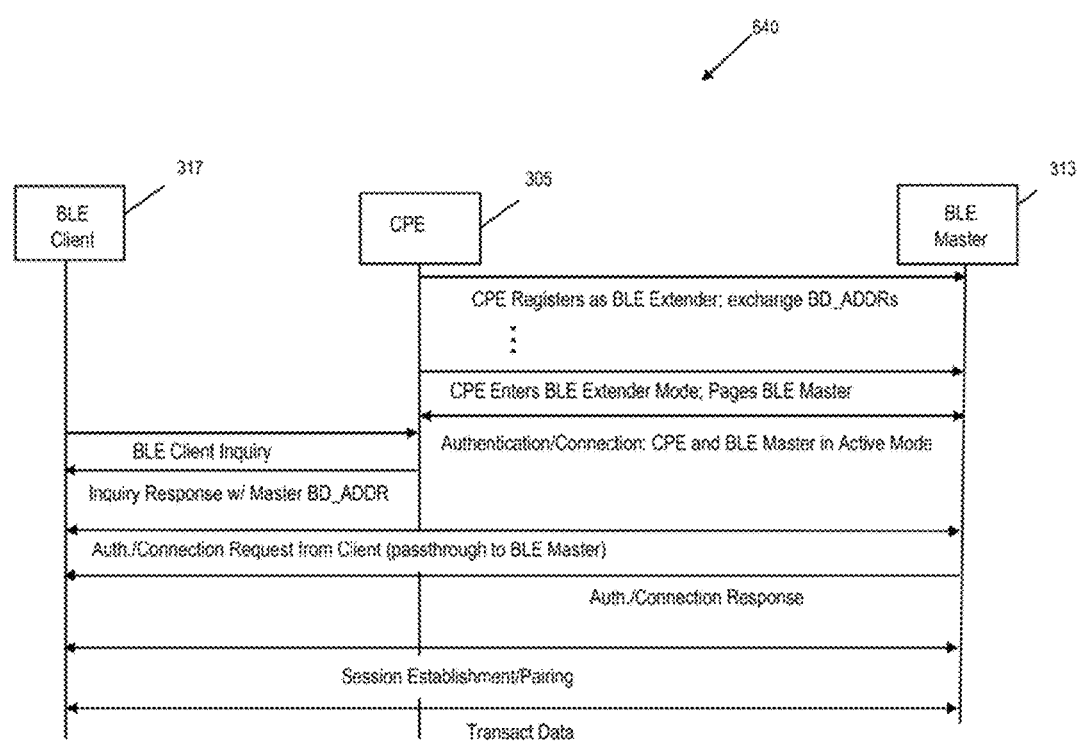
FIG. 6E is a ladder diagram illustrating one embodiment of a multi-mode CPE registration, authentication and connection protocol for using the CPE as an IoT (here, Bluetooth Low Energy or BLE) extender, according to the disclosure.

FIG. 6E is a ladder diagram illustrating an exemplary initial registration protocol 640 for the multi-mode CPE in IoT extender mode in accordance with the architecture of FIG. 4D (here, based on exemplary BLE IoT protocols).

CPE/FWA Apparatus—

Figure 7:
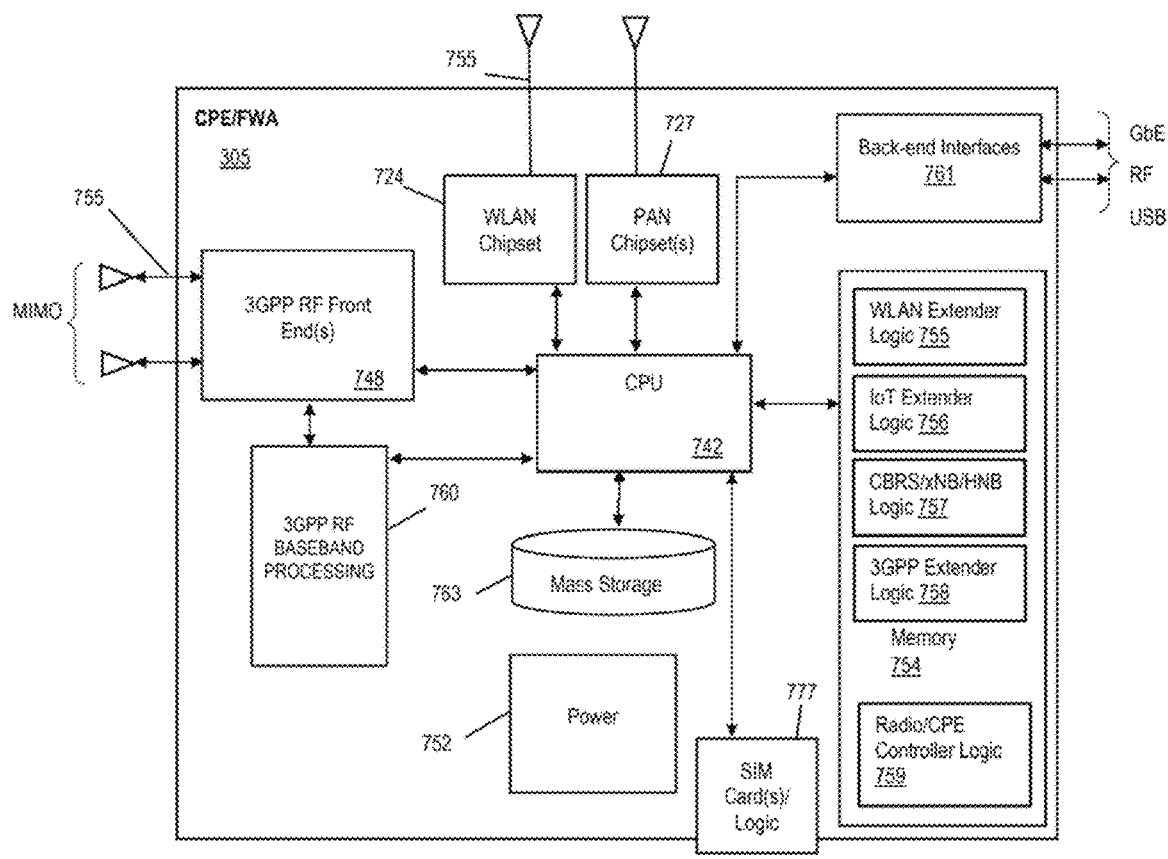
FIG. 7 is a functional block diagram illustrating one embodiment of an exemplary multi-mode Consumer Premises Equipment (CPE) including associated FWA according to the present disclosure.

FIG. 7 illustrates an exemplary embodiment of a CPE/FWA 305 apparatus configured to work in multiple modes as previously described in FIGS. 3-6E, according to the present disclosure. It will be appreciated that while an embodiment of the CPE/FWA apparatus is shown wherein all of the foregoing functionality is included, the CPE/FWA apparatus may be (i) embodied with lesser or alternate degrees of functionality (e.g., some may have all functions, such as for a premium subscriber premises, while others may have lesser or alternate functions such as based on geographic location or type of subscription—e.g., enterprise versus residential); and (ii) the various components and functions may be divided across two or more physical form factors or discrete devices, such as where part of the functionality is disposed in the FWA "radio head" apparatus (e.g., pole- or roof-mounted transceiver), and part in the CPE (indoor device communicate with the FWA radio head, akin to a modem or gateway or DSTB form factor), and even part within the router/AP 307 or IoT gateway 313.

As shown in FIG. 7, the CPE 305 includes, inter alia, a processor apparatus or CPU 742, a program memory module 754, mass storage 763, radio/CPE controller logic module 759, Wi-Fi extender/repeater logic 755, IoT extender logic 756, 3GPP extender logic 757, CBRS/xNB/HNB logic 757, power module 752, WLAN interface 724, PAN interface(s) 727, one or more front end wireless network interfaces 748 for communication with e.g., CBSD/xNB, as well as one or more back end interfaces 761 such as for establishment of, Gigabit Ethernet or other LAN connectivity e.g., via the router 307, support of home or premises gateways, DSTBs, etc.

The antenna module 755 in the exemplary embodiment may include each of the MIMO, MISO or other spatial diversity antenna elements. The RF front end module 748 includes components necessary for receipt and processing of the signals, including logic to determine radio path parameters of interest such as amplitude/RSSI/RSRP, phase, timing, as well as receive beam forming logic (e.g., to form two or more discrete receive beams for among other things, spatial or azimuthal resolution of the signals received from the various CBSD/xNBs 206 in range of the FWA/CPE 305, as well as xNBs 327 in cellular repeater mode, and served 3GPP devices such as local UE 312). As such, the radio/CPE controller logic 759 (or the beam forming logic) may "steer" the antenna array elements to evaluate or analyze particular azimuth values to scan and acquire RF signals of interest from the various CBSD/xNBs or xNBs (or even UE, such as in the case of 5G NR mmWave implementations).

The RF baseband processing module 756 in communication with the CPU 742, is responsible for detecting and demodulating the received RF signals from different paths and combining them into one logical data stream (and converting to an appropriate protocol for distribution within the premises such as IEEE Std. 802.3 Ethernet packets). Combination of the received constituent signals (e.g., user data accessed via the assigned TDD slots and carrier(s) and beams) is accomplished in one embodiment via stream, CBSD/xNB and beam ID data (i.e., each stream of data from the different beam from a different contributing CBSD/xNB 206 or eNB/gNB 327 will have unique ID data that can be used to temporally reconstruct the packet data associated with that stream in proper order and relation).

In the exemplary embodiment, the processor 742 may include one or more of a digital signal processor, microprocessor, field-programmable gate array, GPU, or plurality of processing components mounted on one or more substrates. The processor 742 may also comprise an internal cache memory, and is in communication with a memory subsystem 752, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 742.

The processor 742 is configured to execute at least one computer program stored in memory 754 (e.g., a non-transitory computer readable storage medium); in the illustrated embodiment, such programs include logic to implement the extender, registration/authentication and radio controller functionality described previously herein. Other embodiments may implement such functionality within dedicated hardware, logic, and/or specialized co-processors (not shown).

The embodiment of FIG. 7 also includes a plurality of radio mode logic modules 755, 756, 757, and 758 to enable, inter alia, the CPE 305 to operate in different modes such as Wi-Fi extender, IoT extender, HNB, cellular signal repeater, or as a CBRS/xNB base station, as described elsewhere herein.

The software stack of the CPE 305 is also optionally implemented such that CBSD/xNB, gNB, IoT, HNB, or WLAN AP protocols are used to enable RF detection and reporting functionality, including CPE functions such as (i) generation and transmission of periodic, on-demand or ad hoc RF detection reports; (ii) receipt of network CBRS controller-generated TDD/FDD slot, carrier, and wireless beam assignments; (iii) communication to network backhaul (whether primary or alternate); (iv) and communication with 3GPP eNB/gNBs and other EUTRAN or NR entities such as the EPC or 5GC as required. The logic of the software/firmware stack may also manage other aspects of CPE operation, including "intelligent" monitoring and storage of data for use in e.g., historical associations or connections with certain xNBs, CBSDs, APs, etc., RF or other parametric characterizations of the various CBSD/xNB, eNB/gNB, IoT, or AP devices in radio range of the CPE in terms of signal strength, signal identity, required signal levels for communication therewith, and other useful data.

Intelligent Router Apparatus—

Figure 8:
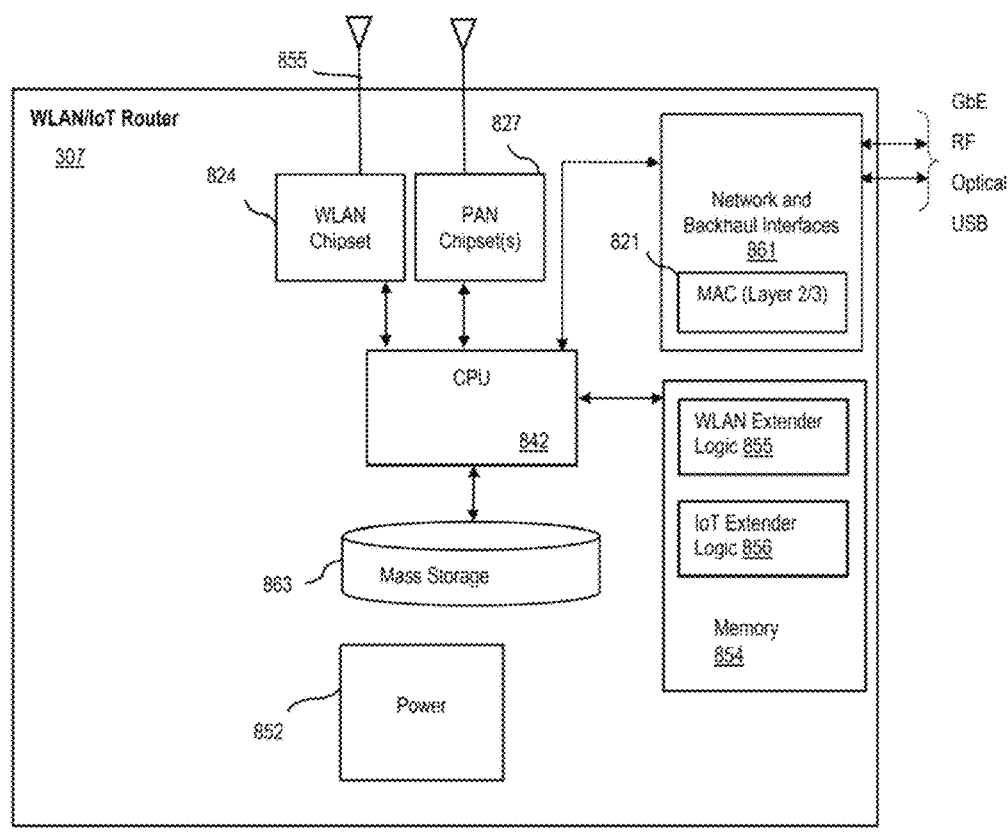
FIG. 8 is a functional block diagram illustrating one embodiment of an exemplary WLAN/IoT router apparatus including extender support, according to the present disclosure.

FIG. 8 illustrates an exemplary embodiment of an intelligent router apparatus 307 configured to work in multiple modes as previously described in FIGS. 3-6E. It will be appreciated that while an embodiment of the router apparatus is shown as a standalone device, the apparatus may be (i) embodied with lesser or alternate degrees of functionality (e.g., some may have all functions, such as for a premium subscriber premises, while others may have lesser or alternate functions such as based on geographic location or type of subscription—e.g., enterprise versus residential); and (ii) the various components and functions may be divided across two or more physical form factors or discrete devices, such as where part of the functionality is disposed in the CPE/FWA 305, and even part within the IoT gateway 313 or another premises apparatus.

As shown in FIG. 8, the router 307 includes, inter alia, a processor apparatus or CPU 842, a program memory module 854, mass storage 863, Wi-Fi extender/repeater logic 855, IoT extender logic 856, power module 852, WLAN interface/chipset 824, PAN interface(s)/chipsets 827, one or more back end interfaces 861 such as for establishment of, Gigabit Ethernet or other LAN connectivity e.g., via the router modem 309, support of home or premises gateways, DSTBs, etc. As shown, the backend interfaces 861 in one embodiment include a MAC (layer 2/3) chipset 821 which provides the routing and similar functions in support of both normal router operation and "pass through" or other data transactions from the CPE/FWA or its clients 311, 312, 317 when operating in abnormal or extension modes. The backend interfaces also serve to enable the secondary backhaul via the appropriate modem 309 whether via DOCSIS, DSL, optical fiber, mmWave, or other approach.

The WLAN extender logic 855 and IoT extender logic 856 are configured to, in the exemplary embodiment, implement the logic of FIG. 5D previously described, as well as IoT gateway-related functions (respectively). For instance, bandwidth allocation and assessment, characterization of current IoT air interfaces and protocols in use within the premises, and communication between CPE-extended IoT clients 317 and the IoT gateway 313 (and its clients) may be facilitated via logic of the IoT extender module 856.

Service Provider Network—

FIG. 9 illustrates an exemplary MSO-based network architecture useful with the extension/repeater functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 900 is used in the embodiment of FIG. 9 to provide backbone and Internet access from the service provider's wireless access nodes (e.g., CBSD/xNBs, Wi-Fi APs, FWA devices or base stations operated or maintained by the MSO), and one or more stand-alone or embedded cable modems (CMs) 933 in data communication therewith.

The individual xNBs 206 are backhauled by the CMs 933 to the MSO core via e.g., CMTS or CCAP MHAv2/RPD or other such architecture, and the MSO core 319 includes at least some of the EPC/5GC core functions previously described, as well as a CPE controller process 919 as shown. The controller process is in one embodiment a network-based server which communicates with the various CPE/FWA (specifically, the CEL (Control and Extension Logic) 935) so as to effect various functions including in some cases the decision logic 506 of FIG. 5 previously described. As previously referenced, the controller 919 can communicate with the CPE/FWA 305 via either the primary backhaul (CBRS link) when operational, and/or the secondary backhaul via the service provider (MSO or other) modem 309 when the primary backhaul is not operational. The CEL 935 may also be configured to fail to its internal logic when communication with the network controller process 919 is lost, in effect self-moderating for decisions of extender/repeater modes and operation.

Each of the CPE/FWA 305 are communicative with their respective xNBs 206, as well as other CPE/FWA as needed to support the relay functions previously described. Client devices 311, 312, 317 such as tablets, smartphones, Smart-TVs, etc. at each premises are served by respective WLAN routers 307, IoT gateways 313, and CPE/FWA 305, the latter which are backhauled to the MSO core or backbone via their respective CPE/FWA during normal modes of operation of the primary (CBRS) links.

It is also envisaged that control data may be transmitted between the CPE/FWA and network controller 919 via low-bandwidth long-range links, such as where the CPE/FWA PAN interfaces (FIG. 7) include a LoRaWAN interface capable of at least reception of control data from the controller (transmitted by e.g., an MSO LoRaWAN transmitter disposed distant from the served premises). In this fashion, neither a primary nor secondary backhaul of the type previously described is required for transmission of the control data. Likewise, the cellular modem on the CPE/FWA (and associated SIM) can be used to establish a control channel between the CPE/FWA and the MSO controller if needed.

Notably, in the embodiment of FIG. 9, all of the necessary components for support of the WLAN, IoT and CBRS repeater functionality are owned, maintained and/or operated by the common entity (e.g., cable MSO). The approach of FIG. 9 has the advantage of, inter alia, giving the MSO complete control over the entire service provider chain (with exception of xNBs 327) so as to optimize service to its specific customers (versus the non-MSO customer-specific service provided by an MNO), and the ability to construct its architecture to optimize incipient 5G NR functions such as network slicing, gNB DU/CU Option "splits" within the CBSD/xNB infrastructure, etc.

FIG. 10 illustrates the relationship between the MSO architecture of FIG. 9 and the MNO architecture 1000. As shown, the MSO service domain extends only to the CPE/FWA and served premises and the MSO core functions, while other functions such as 3GPP EPC/E-UTRAN or 5GC and NG-RAN functionality is provided by one or more MNO networks 1032 operated by MNOs, including in some embodiments with which the MSO has a service agreement. In this approach, the CPE controller server 919 is still maintained and operated by the MSO (since the MSO maintains cognizance over the CPE/FWA and CPE/FWA), although this is not a requirement, and the present disclosure contemplates embodiments where the controller function is maintained by the MNO or even a third party. The approach of FIGS. 9 and 10 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) xNBs or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Appendix I - LTE frequency bands – TS 36.101 (Rel. 14 June 2017)

| Band | Name | Downlink (MHz) Low EARFCN[1] | Downlink (MHz) Middle | Downlink (MHz) High | Bandwidth DL/UL (MHz) | Uplink (MHz) Low EARFCN | Uplink (MHz) Middle | Uplink (MHz) High | Duplex spacing (MHz) | Equivalent UMTS band |
|---|---|---|---|---|---|---|---|---|---|---|
| 1 | 2100 | 2110 0 | 2140 300 | 2170 599 | 60 | 1920 18000 | 1950 18300 | 1980 18599 | 190 | 1 |
| 2 | 1900 PCS | 1930 600 | 1960 900 | 1990 1199 | 60 | 1850 18600 | 1880 18900 | 1910 19199 | 80 | 2 |
| 3 | 1800+ | 1805 1200 | 1842.5 1575 | 1880 1949 | 75 | 1710 19200 | 1747.5 19575 | 1785 19949 | 95 | 3 |
| 4 | AWS-1 | 2110 1950 | 2132.5 2175 | 2155 2399 | 45 | 1710 19950 | 1732.5 20175 | 1755 20399 | 400 | 4 |
| 5 | 850 | 869 2400 | 881.5 2525 | 894 2649 | 25 | 824 20400 | 836.5 20525 | 849 20649 | 45 | 5 |
| 6 | UMTS only | 875 2650 | 880 2700 | 885 2749 | 10 | 830 20650 | 835 20700 | 840 20749 | 45 | 6 |
| 7 | 2600 | 2620 2750 | 2655 3100 | 2690 3449 | 70 | 2500 20750 | 2535 21100 | 2570 21449 | 120 | 7 |
| 8 | 900 GSM | 925 3450 | 942.5 3625 | 960 3799 | 35 | 880 21450 | 897.5 21625 | 915 21799 | 45 | 8 |
| 9 | 1800 | 1844.9 3800 | 1862.4 3975 | 1879.9 4149 | 35 | 1749.9 21800 | 1767.4 21975 | 1784.9 22149 | 95 | 9 |
| 10 | AWS-1+ | 2110 4150 | 2140 4450 | 2170 4749 | 60 | 1710 22150 | 1740 22450 | 1770 22749 | 400 | 10 |
| 11 | 1500 Lower | 1475.9 4750 | 1485.9 4850 | 1495.9 4949 | 20 | 1427.9 22750 | 1437.9 22850 | 1447.9 22949 | 48 | 11 |
| 12 | 700 a | 729 5010 | 737.5 5095 | 746 5179 | 17 | 699 23010 | 707.5 23095 | 716 23179 | 30 | 12 |
| 13 | 700 c | 746 5180 | 751 5230 | 756 5279 | 10 | 777 23180 | 782 23230 | 787 23279 | -31 | 13 |
| 14 | 700 PS | 758 5280 | 763 5330 | 768 5379 | 10 | 788 23280 | 793 23330 | 798 23379 | -30 | 14 |
| 17 | 700 b | 734 5730 | 740 5790 | 746 5849 | 12 | 704 23730 | 710 23790 | 716 23849 | 30 | |
| 18 | 800 Lower | 860 5850 | 867.5 5925 | 875 5999 | 15 | 815 23850 | 822.5 23925 | 830 23999 | 45 | |
| 19 | 800 Upper | 875 6000 | 882.5 6075 | 890 6149 | 15 | 830 24000 | 837.5 24075 | 845 24149 | 45 | 19 |
| 20 | 800 DD | 791 6150 | 806 6300 | 821 6449 | 30 | 832 24150 | 847 24300 | 862 24449 | -41 | 20 |
| 21 | 1500 Upper | 1495.9 6450 | 1503.4 6525 | 1510.9 6599 | 15 | 1447.9 24450 | 1455.4 24525 | 1462.9 24599 | 48 | 21 |
| 22 | 3500 | 3510 6600 | 3550 7000 | 3590 7399 | 80 | 3410 24600 | 3450 25000 | 3490 25399 | 100 | 22 |

---

[1] EUTRA Absolute RF Channel Number

| Band | Name | Downlink (MHz) | | | Bandwidth DL/UL (MHz) | Uplink (MHz) | | | Duplex spacing (MHz) | Equivalent UMTS band |
|---|---|---|---|---|---|---|---|---|---|---|
| | | Low | Middle | High | | Low | Middle | High | | |
| | | EARFCN[1] | | | | EARFCN | | | | |
| 23 | 2000 S-band | 2180 7500 | 2190 7600 | 2200 7699 | 20 | 2000 25500 | 2010 25600 | 2020 25699 | 180 | |
| 24 | 1600 L-band | 1525 7700 | 1542 7870 | 1559 8039 | 34 | 1626.5 25700 | 1643.5 25870 | 1660.5 26039 | -101.5 | |
| 25 | 1900+ | 1930 8040 | 1962.5 8365 | 1995 8689 | 65 | 1850 26040 | 1882.5 26365 | 1915 26689 | 80 | 25 |
| 26 | 850+ | 859 8690 | 876.5 8865 | 894 9039 | 35 | 814 26690 | 831.5 26865 | 849 27039 | 45 | 26 |
| 27 | 800 SMR | 852 9040 | 860.5 9125 | 869 9209 | 17 | 807 27040 | 815.5 27125 | 824 27209 | 45 | |
| 28 | 700 APT | 758 9210 | 780.5 9435 | 803 9659 | 45 | 703 27210 | 725.5 27435 | 748 27659 | 55 | |
| 29 | 700 d | 717 9660 | 722.5 9715 | 728 9769 | 11 | Downlink only | | | | |
| 30 | 2300 WCS | 2350 9770 | 2355 9820 | 2360 9869 | 10 | 2305 27660 | 2310 27710 | 2315 27759 | 45 | |
| 31 | 450 | 462.5 9870 | 465 9895 | 467.5 9919 | 5 | 452.5 27760 | 455 27785 | 457.5 27809 | 10 | |
| 32 | 1500 L-band | 1452 9920 | 1474 10140 | 1496 10359 | 44 | Downlink only | | | | 32 |
| 65 | 2100+ | 2110 65536 | 2155 65986 | 2200 66435 | 90 | 1920 131072 | 1965 131522 | 2010 131971 | 190 | |
| 66 | AWS-3 | 2110 66436 | 2155 66886 | 2200 67335 | 90 / 70 | 1710 131972 | 1745 132322 | 1780 132671 | 400 | |
| 67 | 700 EU | 738 67336 | 748 67436 | 758 67535 | 20 | Downlink only | | | | |
| 68 | 700 ME | 753 67536 | 768 67686 | 783 67835 | 30 | 698 132672 | 713 132822 | 728 132971 | 55 | |
| 69 | 2500 | 2570 67836 | 2595 68086 | 2620 68335 | 50 | Downlink only | | | | |
| 70 | AWS-4 | 1995 68336 | 2007.5 68461 | 2020 68585 | 25 / 15 | 1695 132972 | 1702.5 133047 | 1710 133121 | 300 | |
| 252 | Unlicensed NII-1 | 5150 255144 | 5200 255644 | 5250 256143 | 100 | Downlink only | | | | |
| 255 | Unlicensed NII-3 | 5725 260894 | 5787.5 261519 | 5850 262143 | 125 | Downlink only | | | | |
| TDD | | | | | | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TD PCS Lower | 1850 36350 | 1880 36650 | 1910 36949 | 60 | | | | | B(lo) |
| 36 | TD PCS Upper | 1930 36950 | 1960 37250 | 1990 37549 | 60 | | | | | B(hi) |
| 37 | TD PCS Center gap | 1910 37550 | 1920 37650 | 1930 37749 | 20 | | | | | C |
| 38 | TD 2600 | 2570 37750 | 2595 38000 | 2620 38249 | 50 | | | | | D |

| Band | Name | Downlink (MHz) | | | Bandwidth DL/UL (MHz) | Uplink (MHz) | | | Duplex spacing (MHz) | Equivalent UMTS band |
|---|---|---|---|---|---|---|---|---|---|---|
| | | Low | Middle | High | | Low | Middle | High | | |
| | | EARFCN[1] | | | | EARFCN | | | | |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD 700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

What is claimed is:

1. A computerized method of operating a premises wireless apparatus, the computerized method comprising:

utilizing a first wireless interface of the premises wireless apparatus as a wireless backhaul for one or more computerized devices of a premises to at least one base station; and based at least on one of a loss or incipient loss of connection on the first wireless interface during said utilizing, causing the premises wireless apparatus to operate as an extension access point for at least one of the one or more computerized devices, the operation as the extension access point comprising utilizing a second wireless interface of the premises wireless apparatus;

wherein the utilizing of the second wireless interface of the premises wireless apparatus comprises configuring the premises wireless apparatus to extend signals from an IEEE (Institute of Electrical and Electronics Engineers) Std. 802.11-compliant wireless access point (AP) or router to one or more areas outside of a structure on the premises via one or more antenna elements mounted externally to or on the structure.

2. The computerized method of claim 1, wherein:

the utilizing the first wireless interface further comprises transmitting the signals within a frequency range between 3.550 and 3.70 GHz inclusive; and the at least one base station comprises a CBRS (Citizens Broadband Radio Service) compliant CBSD (Citizens Broadband Radio Service device).

3. The computerized method of claim 1, wherein the at least one base station and the premises wireless apparatus utilize 3rd Generation Partnership Project (3GPP)-compliant 5G NR-U (Fifth Generation New Radio—Unlicensed) air interface technology for said wireless backhaul.

4. The computerized method of claim 1, wherein the premises wireless apparatus is connected to the IEEE Std. 802.11-compliant wireless AP or router via a cable link, and the computerized method further comprises using the IEEE Std. 802.11-compliant wireless AP or router to access Internet via a service provider modem.

5. The computerized method of claim 4, further comprising:

sending data relating to at least one of (i) an SSID, or (ii) one or more operating channels, to the premises wireless apparatus; and utilizing the at least one of the SSID or the one or more operating channels during transmissions from the premises wireless apparatus based at least in part on the sent data.

6. A computerized method of operating a premises wireless apparatus, the computerized method comprising:

utilizing a first wireless interface of the premises wireless apparatus as a wireless backhaul for one or more computerized devices of a premises to at least one base station;

receiving, from a network process in data communication with the premises wireless apparatus, data indicative an incipient loss of connection on the first wireless interface during said utilizing, the receiving being prior to any actual loss of the connection; and based at least on the data indicative of the incipient loss of the connection on the first wireless interface, causing the premises wireless apparatus to operate as an extension access point for at least one of the one or more computerized devices, the operation as the extension access point comprising utilizing a second wireless interface of the premises wireless apparatus.

7. The computerized method of claim 6, wherein the received data indicative of the incipient loss of the connection on the first wireless interface during said utilizing is transmitted from the network process to the premises wireless apparatus in response to a spectrum grant withdrawal by a CBRS (Citizens Broadband Radio Service) SAS (spectrum allocation system).

8. The computerized method of claim 6, further comprising utilizing the premises wireless apparatus to transact signals with at least one mobile client device at the premises prior to the any actual loss of the connection, the transaction of the signals with the at least one mobile client device conducted according to at least one of a 3GPP LTE (Long Term Evolution) or 5G NR (Fifth Generation New Radio) air interface technology standard, and utilizing at least one of an unlicensed spectrum or quasi-licensed spectrum.

9. A computerized method of operating a premises wireless apparatus of a premises, the computerized method comprising:

utilizing the premises wireless apparatus to measure a plurality of signals received from a plurality of respective cellular base stations;

selecting at least one cellular base station for extension of a connection, the selecting based at least on one or more parameters associated with the received plurality of signals, the at least one cellular base station comprising a CBRS (Citizens Broadband Radio Service) compliant CBSD (Citizens Broadband radio Service Device);

utilizing a first wireless interface of the premises wireless apparatus as a wireless backhaul for one or more computerized devices of the premises to the at least one cellular base station, the wireless backhaul operating within a frequency band of 3.550 to 3.700 inclusive; and responsive to a loss or incipient loss of connection on the first wireless interface during said utilizing, causing the premises wireless apparatus to operate as an extension access point for at least one other cellular base station with which the premises wireless apparatus can establish a connection.

10. The computerized method of claim 9, wherein the CBRS compliant CBSD and the premises wireless apparatus utilize 3GPP-compliant LTE or 5G NR (Fifth Generation New Radio) air interface technology for said wireless backhaul.

11. The computerized method of claim 10, wherein the at least one other cellular base station and the premises wireless apparatus utilize 3rd Generation Partnership Project (3GPP)-compliant LTE or 5G NR (Fifth Generation New Radio) air interface technology operating within a licensed band for said connection in support of said extension.

12. The computerized method of claim 9, wherein the selecting based at least on the one or more parameters comprises selecting the at least one cellular base station based on highest referenced signal received power (RSRP).

13. The computerized method of claim 9, wherein the selecting the at least one cellular base station causes the at least one cellular base station to allocate specified resources to the premises wireless apparatus.

14. Computer readable apparatus comprising a non-transitory storage medium, the non-transitory storage medium comprising at least one computer program having a plurality of instructions, the plurality of instructions configured to, when executed on a processing apparatus of a computerized wireless premises apparatus of a premises, cause the computerized wireless premises apparatus to:

- utilize a first wireless interface of the computerized wireless premises apparatus as a wireless backhaul for one or more computerized premises devices to at least one base station; and
- based at least on a loss or incipient loss of connection on the first wireless interface during said utilization, operate the computerized wireless premises apparatus as an extension access point for at least one of the one or more computerized premises devices, the operation as an extension access point comprising utilization of a second wireless interface of the computerized wireless premises apparatus;
- wherein the operation of the computerized wireless premises apparatus as the extension access point comprises configuration of the computerized wireless premises apparatus to extend signals from at least one of an IoT (Internet of Things) gateway apparatus or IoT router associated with the IoT gateway apparatus to one or more areas outside of a structure on the premises via one or more antenna elements mounted externally to or on the structure, in order to serve one or more IoT sensors disposed external to the structure.

15. The computer readable apparatus of claim 14, wherein the plurality of instructions are further configured to, when executed on the processing apparatus, cause the computerized wireless premises apparatus to:

- measure a plurality of signals received at the computerized wireless premises apparatus; and
- based on the measurement, select the at least one base station, the at least one base station having a best calculated putative performance level of a plurality of base stations from which the plurality of signals respectively emanated.

16. The computer readable apparatus of claim 15, wherein the selection of the at least one base station is based on the at least one base station having a highest referenced signal received power (RSRP) of the plurality of base stations.

17. The computer readable apparatus of claim 14, wherein the computerized wireless premises apparatus is associated with a network operator of a managed content distribution network, the computerized wireless premises apparatus configured to communicate via a cable link to one or more wireless access point apparatus to obtain high-speed data services at least when the wireless backhaul is disabled or inoperative, and utilize the one or more wireless access point apparatus to connect to the wireless backhaul via the cable link.

18. The computer readable apparatus of claim 14, wherein the plurality of instructions are further configured to, when executed on the processing apparatus, cause the computerized wireless premises apparatus to:

- determine at least one of an available type or capacity of the wireless backhaul which is then-currently operational; and
- based at least on the determination, select at least one of a plurality of functional modes of the computerized wireless premises apparatus for operation.

19. The computer readable apparatus of claim 18, wherein the available type or capacity of the wireless backhaul comprises a limited-bandwidth connection insufficient to support broadband operation, and the plurality of instructions are further configured to, when executed on the processing apparatus, cause the computerized wireless premises apparatus to:

- select an IoT mode of operation for the computerized wireless premises apparatus.

* * * * *